(12) United States Patent
Jueng et al.

(10) Patent No.: US 10,719,119 B2
(45) Date of Patent: Jul. 21, 2020

(54) MOBILE TERMINAL AND METHOD FOR CONTROLLING THE SAME

(71) Applicant: LG ELECTRONICS INC., Seoul (KR)

(72) Inventors: Mose Jueng, Seoul (KR); Yong Kim, Seoul (KR); Soomin Kim, Seoul (KR); Yongchul Shin, Seoul (KR); Sunjung Lee, Seoul (KR); Jungeun Shin, Seoul (KR); Jeonghyun Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 133 days.

(21) Appl. No.: 15/085,911

(22) Filed: Mar. 30, 2016

(65) Prior Publication Data
US 2016/0299556 A1 Oct. 13, 2016

(30) Foreign Application Priority Data

Apr. 8, 2015 (KR) .......................... 10-2015-0049795
Jun. 1, 2015 (KR) .......................... 10-2015-0077419

(51) Int. Cl.
*G06F 1/3287* (2019.01)
*G06K 9/00* (2006.01)
(Continued)

(52) U.S. Cl.
CPC .......... *G06F 1/3287* (2013.01); *G06F 1/1626* (2013.01); *G06F 1/1684* (2013.01);
(Continued)

(58) Field of Classification Search
None
See application file for complete search history.

(56) References Cited

U.S. PATENT DOCUMENTS 8,229,400 B1 * 7/2012 Shenvi Kuncolienkar ..................
H04M 1/72563
455/411
2006/0288234 A1 12/2006 Azar et al.
(Continued)

FOREIGN PATENT DOCUMENTS

CN 102902935 1/2013
DE 202014103257 1/2015
(Continued)

OTHER PUBLICATIONS

European Patent Application No. 16162757.5, Search Report dated Oct. 5, 2016, 11 pages.
(Continued)

*Primary Examiner* — Christopher R Lamb
(74) *Attorney, Agent, or Firm* — Lee, Hong, Degerman, Kang & Waimey

(57) ABSTRACT

The present disclosure relates to a mobile terminal capable of fingerprint recognition, and a control method thereof. A mobile terminal according to the present disclosure may include a terminal body, a display unit disposed on a front surface of the body, a sensing unit configured to receive a user's touch input to recognize the user's fingerprint, and a controller configured to display preset screen information on the display unit while the user's touch input is applied to the sensing unit based on the authentication of the recognized user's fingerprint.

9 Claims, 26 Drawing Sheets

(51) Int. Cl.
| | |
|---|---|
| *G06F 3/041* | (2006.01) |
| *G09G 5/00* | (2006.01) |
| *G06F 1/3234* | (2019.01) |
| *G06F 1/3231* | (2019.01) |
| *G06F 21/32* | (2013.01) |
| *G06F 3/0487* | (2013.01) |
| *G06F 1/16* | (2006.01) |
| *H04M 1/67* | (2006.01) |
| *H04L 29/06* | (2006.01) |
| *H04N 21/4415* | (2011.01) |
| *H04W 12/06* | (2009.01) |

(52) U.S. Cl.
CPC .......... *G06F 1/3231* (2013.01); *G06F 1/3265* (2013.01); *G06F 3/0412* (2013.01); *G06F 3/0487* (2013.01); *G06F 21/32* (2013.01); *G06K 9/0002* (2013.01); *G09G 5/003* (2013.01); *H04L 29/06809* (2013.01); *H04L 63/0861* (2013.01); *H04M 1/67* (2013.01); *H04N 21/4415* (2013.01); *H04W 12/06* (2013.01); *G06F 2221/2139* (2013.01); *G09G 2330/023* (2013.01); *G09G 2354/00* (2013.01); *G09G 2358/00* (2013.01)

(56) References Cited

U.S. PATENT DOCUMENTS

| | | | | |
|---|---|---|---|---|
| 2007/0008066 A1* | 1/2007 | Fukuda | ............... | G06F 3/03547 340/5.52 |
| 2007/0140530 A1* | 6/2007 | Coogan | ............... | G06F 3/03547 382/115 |
| 2010/0225607 A1* | 9/2010 | Kim | ........................ | G06F 3/042 345/173 |
| 2012/0069042 A1* | 3/2012 | Ogita | .................. | H04M 1/0264 345/589 |
| 2012/0071149 A1* | 3/2012 | Bandyopadhyay | ... | G06F 1/1643 455/418 |
| 2013/0208103 A1 | 8/2013 | Sands et al. | | |
| 2013/0318625 A1 | 11/2013 | Fan | | |
| 2014/0181962 A1 | 6/2014 | Seo et al. | | |
| 2014/0283128 A1 | 9/2014 | Shepherd et al. | | |
| 2014/0366158 A1* | 12/2014 | Han | ........................ | G06F 21/32 726/28 |
| 2014/0378099 A1* | 12/2014 | Huang | .................... | H04M 1/67 455/411 |
| 2015/0074615 A1* | 3/2015 | Han | .................. | G06K 9/00033 715/863 |

FOREIGN PATENT DOCUMENTS

| | | |
|---|---|---|
| EP | 1715663 | 10/2006 |
| EP | 2713298 | 4/2014 |
| EP | 2784657 | 10/2014 |
| EP | 2835755 | 2/2015 |
| JP | 2013171223 | 9/2013 |
| WO | 3127724 | 4/2001 |

OTHER PUBLICATIONS

European Patent Office Application Serial No. 16162757.5, Office Action dated Jul. 17, 2018, 7 pages.
Anonymous: "Phones you can unlock with your fingerprint (pictures)—CNET—p. 4," Retrieved from the web, XP055490638, Mar. 2014, 2 pages.
European Patent Office Application Serial No. 16162757.5, Summons dated Mar. 27, 2019, 9 pages.
State Intellectual Property Office of the People's Republic of China Application Serial No. 201610213317.2, Office Action dated Jan. 3, 2020, 6 pages.

* cited by examiner

MOBILE TERMINAL AND METHOD FOR CONTROLLING THE SAME

CROSS-REFERENCE TO RELATED APPLICATIONS

Pursuant to 35 U.S.C. § 119(a), this application claims the benefit of earlier filing date and right of priority to Korean Application No. 10-2015-0049795, filed on Apr. 8, 2015, and Korean Application No. 10-2015-0077419, filed on Jun. 1, 2015, the contents of which are all hereby incorporated by reference herein in their entirety.

BACKGROUND OF THE INVENTION

1. Field of the Invention

The present disclosure relates to a mobile terminal capable of fingerprint recognition, and a control method thereof.

2. Description of the Related Art

Terminals may be generally classified into mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can be allowed to capture still images or moving images, play music or video files, play games, receive broadcast and the like, so as to be implemented as an integrated multimedia player.

Furthermore, a lock mode of the terminal may be set in various ways such as a pattern, a password, a PIN, voice recognition, iris recognition, fingerprint recognition, and the like to protect personal information.

In order to execute a desired function when a lock mode is set, there exists a burden of performing various entry procedures such as entering a pattern, a password or the like to release the lock mode, and then getting to a home screen to apply a touch input to an icon corresponding to the function, and the like.

On the other hand, in case of fingerprint recognition capable of releasing a lock mode in a relatively simple manner, there exists a problem in which the current consumption of a battery increases due to the current consumption of a fingerprint recognition sensor. Accordingly, in case of reducing the current consumption, a recognition rate of the fingerprint recognition sensor may be decreased.

In order to support or enhance such a function of the terminal, improvement in the structural portion and/or software portion of the terminal may be taken into consideration.

SUMMARY OF THE INVENTION

An object of the present disclosure is to solve the foregoing problems and other problems.

In order to accomplish the foregoing and other objects, according to an aspect of the present disclosure, there is provided a mobile terminal, including a terminal body, a display unit disposed on a front surface of the body, a sensing unit configured to receive a user's touch input to recognize the user's fingerprint, and a controller configured to display preset screen information on the display unit while the user's touch input is applied to the sensing unit based on the authentication of the recognized user's fingerprint.

According to an embodiment, the controller may turn off a fingerprint recognition function of the sensing unit when the display unit is switched from an active state to an inactive state, and turn on the fingerprint recognition function of the sensing unit based on a preset touch input applied to the sensing unit while the display unit is in an inactive state.

According to another embodiment, the controller may display the preset screen information on the display unit while the user's touch input is applied to the sensing unit based on the authentication of the recognized user's fingerprint while the display unit is in an inactive state.

According to another embodiment, the controller may execute a control operation corresponding to a user's input applied to the preset screen information while the user's touch input is applied to the sensing unit.

According to another embodiment, the controller may display information associated with an object on the display unit based on a preset touch input applied to the object included in the preset screen information while the user's touch input is applied to the sensing unit.

According to another embodiment, the controller may end the display of the preset screen information based on the ending of a user's touch input applied to the sensing unit to switch the display unit to an inactive state.

According to another embodiment, the controller may end the display of the preset screen information based on the ending of a user's touch input applied to the sensing unit, and redisplay screen information that has been displayed prior to displaying the preset screen information on the display unit.

According to another embodiment, the controller may display the preset screen information on the display unit while the user's touch input is applied to the sensing unit based on the authentication of the recognized user's fingerprint in a state that screen information corresponding to a locked state is displayed on the display unit.

According to another embodiment, the controller may end the display of the preset screen information based on the ending of a user's touch input applied to the sensing unit, and redisplay screen information corresponding to the locked state on the display unit.

According to another embodiment, the controller may display preset screen information on the display unit to be displayed in connection with a preset application during fingerprint recognition while the user's touch input is applied to the sensing unit based on the authentication of the recognized user's fingerprint in a state that an execution screen of the preset application is displayed on the display unit.

According to another embodiment, the controller may execute a preset application based on the authentication of the recognized user's fingerprint, and display an execution screen of the preset application on the display unit while the user's touch input is applied to the sensing unit.

According to another embodiment, the controller may store information generated during the execution of the application in a memory that is readable when the fingerprint is authenticated.

According to another embodiment, the controller may display preset visual information in one region of the display unit in a preset inactive state to be displayed in response to a preset first touch input in response to at least one of a fingerprint sensed on the fingerprint recognition sensor and the first touch input, while the user's touch input is applied to the sensing unit, based on the authentication of the recognized user's fingerprint while the display unit is in an inactive state and the first touch input applied to the display unit in the inactive state.

Furthermore, according to another aspect of the present disclosure, there is provided a control method of a mobile terminal, and the method may include (a) receiving a user's touch input applied to a sensing unit to recognize the user's fingerprint, and (b) displaying preset screen information on a display unit while the user's touch input is applied to the sensing unit based on the authentication of the recognized user's fingerprint.

According to an embodiment, the step (a) may include turning off a fingerprint recognition function of the sensing unit when the display unit is switched from an active state to an inactive state, and turning on the fingerprint recognition function of the sensing unit based on a preset touch input applied to the sensing unit while the display unit is in an inactive state.

According to another embodiment, the step (b) may include displaying the preset screen information on the display unit while the user's touch input is applied to the sensing unit based on the authentication of the recognized user's fingerprint while the display unit is in an inactive state.

According to another embodiment, the step (b) may include executing a control operation corresponding to a user's input applied to the preset screen information while the user's touch input is applied to the sensing unit.

According to another embodiment, the method may further include (c) ending the display of the preset screen information based on the ending of a user's touch input applied to the sensing unit to switch the display unit to an inactive state.

According to another embodiment, the method may further include (c) ending the display of the preset screen information based on the ending of a user's touch input applied to the sensing unit, and redisplaying screen information that has been displayed prior to displaying the preset screen information on the display unit.

According to another embodiment, the step (b) may include displaying preset visual information in one region of the display unit in a preset inactive state to be displayed in response to a preset first touch input in response to at least one of a fingerprint sensed on the fingerprint recognition sensor and the first touch input, while the user's touch input is applied to the sensing unit, based on the authentication of the recognized user's fingerprint while the display unit is in an inactive state and the first touch input applied to the display unit in the inactive state.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers and the like, excluding a case of being applicable only to the mobile terminals.

Figure 1A:
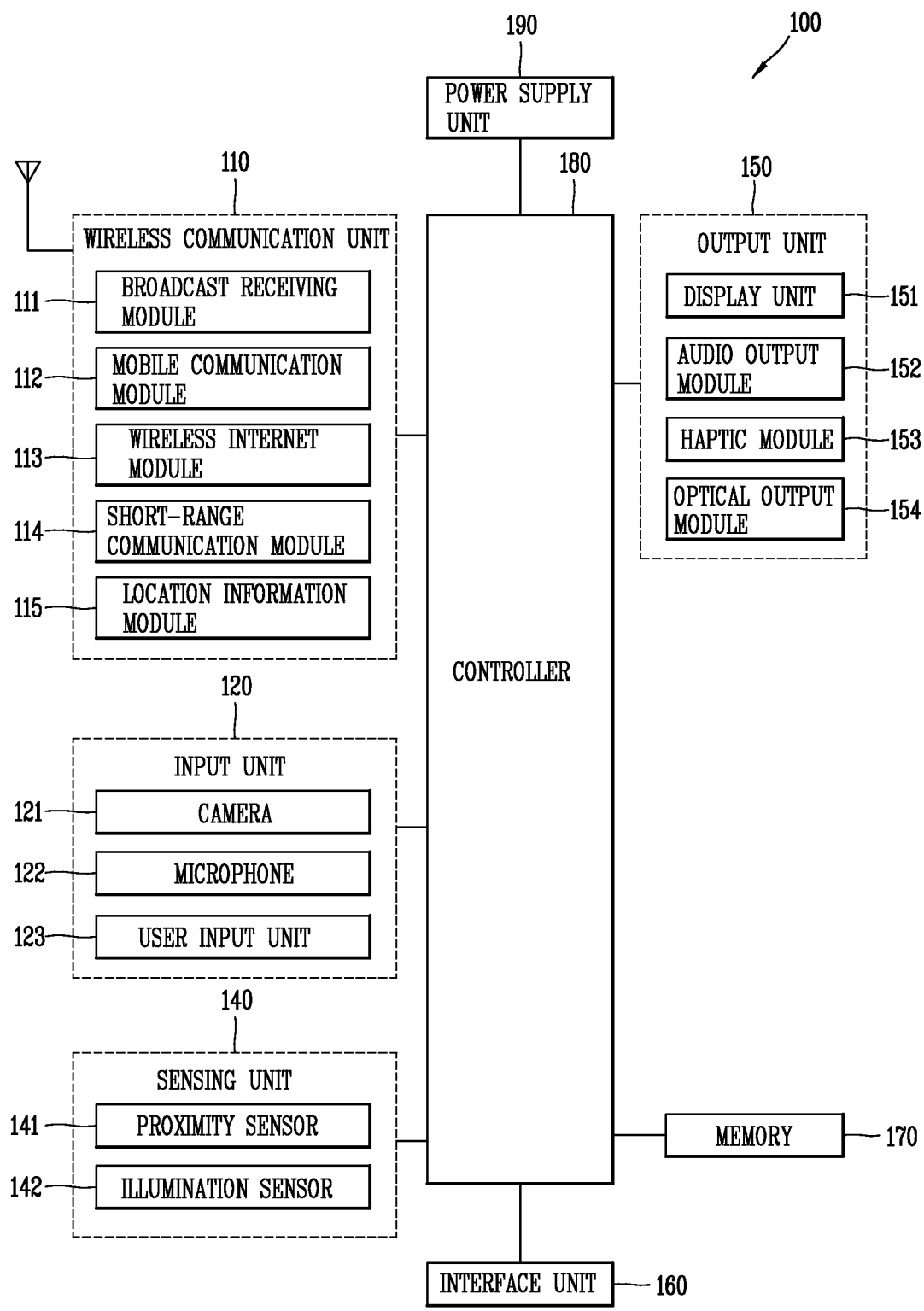
FIG. 1A is a block diagram for explaining a mobile terminal associated with the present disclosure.
Figure 1B:
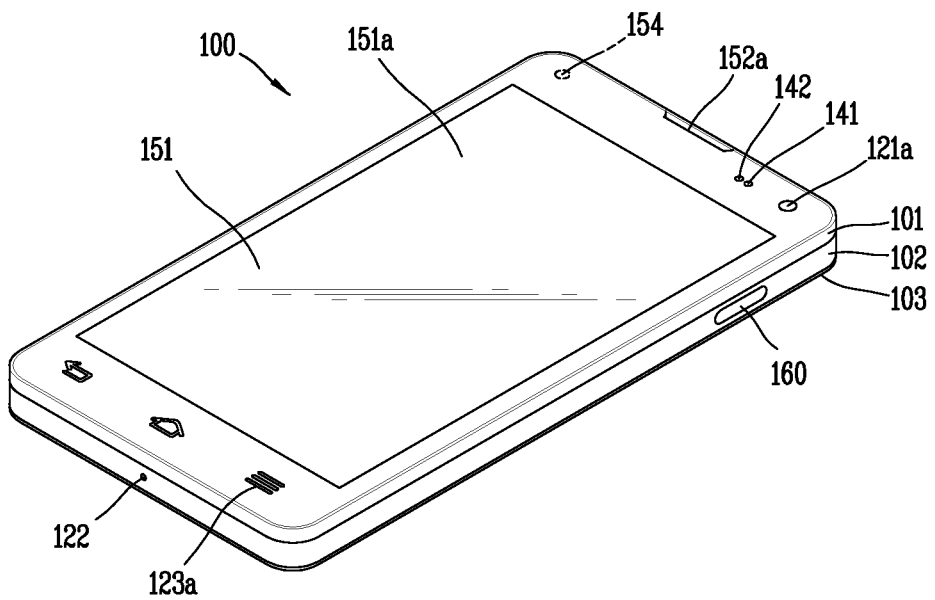
FIGS. 1B and 1C are conceptual views illustrating an example in which a mobile terminal associated with the present disclosure is seen from different directions.
Figure 1C:
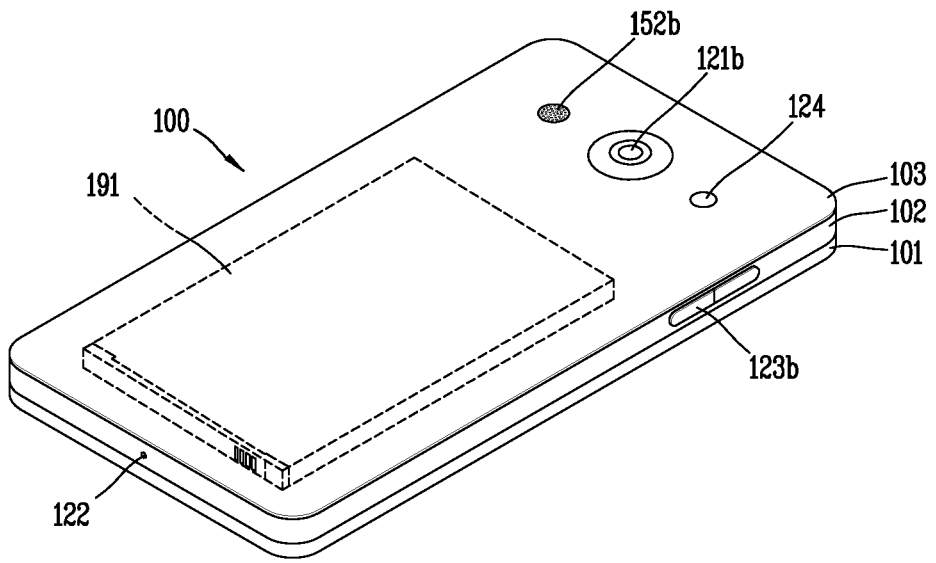

Referring to FIGS. 1A through 1C, FIG. 1A is a block diagram of a mobile terminal in accordance with the present disclosure, FIGS. 1B and 1C are conceptual views of one example of the mobile terminal, viewed from different directions.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output module 152, a haptic module 153, an optical output module 154 and the like. The display unit 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

The memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

The controller 180 may control at least part of the components illustrated in FIG. 1, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

Here, the wireless signals may include audio call signal, video (telephony) call signal, or various formats of data according to transmission/reception of text/multimedia messages.

The wireless Internet module 113 denotes a module for wireless Internet access. This module may be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless Universal Serial Bus (Wireless USB) and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 may be a wearable device, for example, a smart watch, a smart glass or a head mounted display (HMD), which is able to exchange data with the mobile terminal 100 (or to cooperate with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 denotes a module for detecting or calculating a position of the mobile terminal. An example of the location information module 115 may include a Global Position System (GPS) module or a Wi-Fi module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. According to the need, the location information module 115 may perform any function of the other modules of the wireless communication unit 110 to obtain data on the location of the mobile terminal. As a module used to acquire the location (or current location) of the mobile terminal, the location information module 115 may not be necessarily limited to a module for directly calculating or acquiring the location of the mobile terminal.

Hereinafter, the input unit 120 will be described in more detail. The input unit 120 may be configured to provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

The sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may be categorized into a proximity sensor.

Hereinafter, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

On the other hand, the touch sensor may be formed to sense a touch input using a different scheme in an active or inactive state of the display unit 151. At this time, the different scheme may be associated with an active period of the touch sensor. More specifically, the touch sensor may be activated with a different period according to whether or not the display unit 151 is activated. In other words, the touch sensor may have a different active period according to whether or not the display unit 151 is activated to sense a touch input applied to the touch sensor.

For example, when the display unit 151 is in an inactive state, the touch sensor may be activated with a preset specific period. In this case, the specific period may be a period corresponding to a time greater than zero. Furthermore, when the display unit 151 is in an active state, the touch sensor may be always operated in an active state. In other words, in this case, an activated period of the touch sensor may be a period having a time zero or very close to zero.

Whether or not the touch sensor is activated may be determined using the power consumption of the touch sensor. For example, the touch sensor may correspond to an inactive state when the power consumption of the touch sensor is less than a preset reference value based on zero, and may be referred to as an active state when the power consumption of the touch sensor is greater than a preset reference value based on zero.

When the display unit 151 is in an active state (hereinafter, referred to as an "active mode"), the touch sensor may continuously maintain the active state, and wait form the application of a touch input to the display unit 151. On the contrary, when the display unit 151 is in an inactive state (hereinafter, referred to as a "doze mode"), the touch sensor may be activated for each a preset specific period.

On the other hand, as reducing a specific period in which the touch sensor is activated, a speed for sensing a touch input hitting the display unit 151 may increase, but accordingly power consumed by the touch sensor may also increase. On the contrary, as increasing the period in which the touch sensor is activated, a speed for sensing a touch input hitting the display unit 151 may decrease though power consumed by the touch sensor decreases.

Accordingly, the specific period may be set to enhance the efficiency of power consumption while the sensing speed is fast enough to the extent that cannot be recognized by the user in sensing a touch input hitting the display unit 151. For example, the specific period may be set such that the touch sensor is inactive and then active 20 times (Hz) per second.

On the other hand, while the display unit 151 is in an active state, the touch sensor may be also activated, and the active period (T) in an active state may be zero or very close to zero. Otherwise, the period of the touch sensor while the touch sensor is in an active state may be shorter several times than a specific period set to activate the touch sensor while the display unit 151 is in an inactive state.

On the other hand, when a preset touch input (for example, a first and a second touch input consecutively hitting a predetermined region within a reference period of time) is sensed by the touch sensor in a doze mode in which the display unit 151 is deactivated and the touch sensor is periodically activated, the controller 180 may switch the doze mode to an active mode in which the display unit and touch sensor are activated.

In addition, the touch sensor may be driven with a different period based on the state of the display unit 151. For example, the touch sensor may execute a doze mode when the display unit 151 is in a closed state, and execute an active mode when switching from the closed state to an open state.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swype touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor. The camera sensor may include at least one of a photo sensor (or image sensor) and a laser sensor.

The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may also be implemented as a stereoscopic display unit for displaying stereoscopic images.

The stereoscopic display unit 152 may employ a stereoscopic display scheme such as stereoscopic scheme (a glass scheme), an auto-stereoscopic scheme (glassless scheme), a projection scheme (holographic scheme), or the like.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors. The signal output may be terminated as the mobile terminal senses a user's event checking.

The interface unit 160 may serve as an interface with every external device connected with the mobile terminal 100. For example, the interface unit 160 may receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 may typically control the general operations of the mobile terminal 100. For example, the controller 180 may set or release a lock state for restricting a user from inputting a control command with respect to applications when a status of the mobile terminal meets a preset condition.

The controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the mobile terminal 100 under the control of the controller 180. The power supply unit 190 may include a battery. The battery may be an embedded battery which is rechargeable or be detachably coupled to the terminal body for charging.

The power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Referring to FIGS. 1B and 1C, the mobile terminal 100 disclosed herein may be provided with a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner. The description to be associated with a specific type of mobile terminal or on a specific type of mobile terminal will be also typically applied to another type of mobile terminal.

Here, the terminal body may be understood as a conception which indicates the mobile terminal 100 as at least one assembly.

The mobile terminal 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

The cases 101, 102, 103 may be formed by injection-molding synthetic resin or may be formed of a metal, for example, stainless steel (STS), titanium (Ti), or the like.

Unlike the example which the plurality of cases form an inner space for accommodating such various components, the mobile terminal 100 may be configured such that one case forms the inner space. In this example, a mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an exemplary mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

Here, those components may not be limited to the arrangement, but be excluded or arranged on another surface if necessary. For example, the first manipulation unit 123a may not be disposed on the front surface of the terminal body, and the second audio output module 152b may be disposed on the side surface other than the rear surface of the terminal body.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151a and a display (not shown) on a rear surface of the window 151a or patterned directly on the rear surface of the window 151a. Or, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or hidden in terms of appearance, thereby further simplifying the appearance of the mobile terminal 100.

The optical output module 154 may output light for indicating an event generation. Examples of the event generated in the mobile terminal 100 may include a message reception, a call signal reception, a missed call, an alarm, a schedule notice, an email reception, information reception through an application, and the like. When a user's event checking is sensed, the controller may control the optical output unit 154 to stop the output of the light.

The first camera 121a may process video frames such as still or moving images obtained by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the mobile terminal 100. The first and second manipulation units 123a and 123b may also be commonly referred to as a manipulating portion, and may employ any method if it is a tactile manner allowing the user to perform manipulation with a tactile feeling such as touch, push, scroll or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a (refer to FIG. 1A), and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 (refer to FIG. 1A) for supplying power to the mobile terminal 100 may be disposed on the terminal body. The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Figure 2:
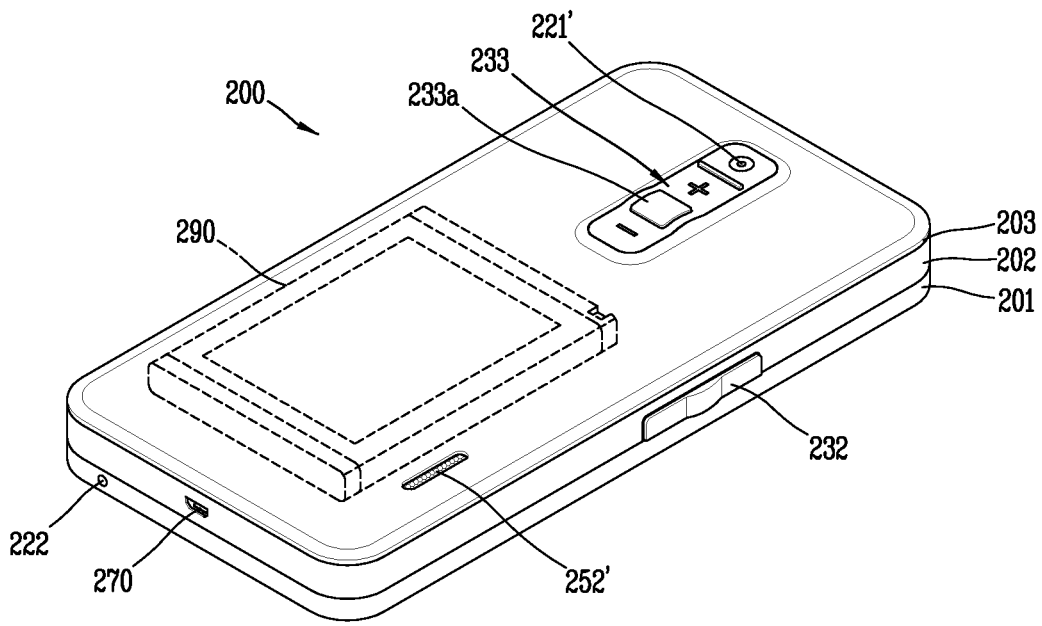
FIG. 2 is a conceptual view illustrating another embodiment in which a mobile terminal associated with the present disclosure is seen from a rear surface.

FIG. 2 is a conceptual view illustrating another embodiment in which a mobile terminal associated with the present disclosure is seen from a rear surface.

Referring to FIG. 2, a camera module 221' may be additionally mounted on a rear surface of the terminal body, namely, the rear case 202. The camera module 221' may be a camera having a capture direction, which is substantially opposite to the direction of the camera 121a (refer to FIG. 1B), and having a different number of pixels from that of the camera module 121a.

For example, it is preferable that the camera module 121a on a front surface has a relatively small number of pixels enough not to cause difficulty when the user captures his or her own face and immediately sends it to the other party during a video call or the like, and the camera module 221' on a rear surface has a relatively large number of pixels since the user often captures a general object but does not sends it immediately. The camera modules 121a, 221' may be provided in the terminal body in a rotatable and popupable manner.

A flash and a mirror (not shown) may be additionally disposed adjacent to the camera module 221'. The flash illuminates light toward an subject when capturing a subject with the camera module 221'. The mirror allows the user to look at his or her own face, or the like, in a reflected manner when capturing himself or herself (in a self-portrait mode) by using the camera module 221'.

An audio output module 252' may be additionally disposed on a rear surface of the terminal body. The audio output module 252' on a rear surface thereof along with the audio output module 152a (refer to FIG. 1B) on a front surface thereof can implement a stereo function, and may be also used to implement a speaker phone mode during a phone call.

A power supply unit 290 for supplying power to the mobile terminal 200 may be mounted on the terminal body. The power supply unit 290 may be configured to be incorporated in the terminal body, or directly detachable from the outside of the terminal body.

According to the drawing, a rear input unit 233 may be disposed on a rear surface of the terminal body. The rear input unit 233 may be located adjacent to the camera module 221', for example.

The rear input unit 233 may be manipulated to receive a command for controlling the operation of the mobile terminal 200, and the received content may be set in various ways. For example, it may be possible to receive a command such as power on/off, start, end, scroll or the like, or a command such as audio volume control output from the audio output module 152a, 252', switching to a touch recognition mode of the display module 151a, or the like. The rear input unit 233 may be implemented in a mode of receiving a push and a touch input.

For another embodiment, the sensing unit 140 capable of receiving a user's touch input to recognize the user's fingerprint may be disposed in one region 233a of the rear input unit 233. Specifically, the touch sensor and fingerprint recognition sensor (or finger scan sensor) may be disposed in the one region 233a to recognize a fingerprint of a user finger that touches or pushes the one region 233a.

As described above, the touch sensor may be formed to sense a touch input using a different mode while the display unit 151 is in an active state or in an inactive state.

Similarly, whether or not to activate the fingerprint recognition sensor may be determined by the status of the display unit 151, a user's touch input, and the like.

Specifically, the fingerprint sensor may be formed to sense a user's fingerprint using a different scheme in an active or inactive state of the display unit 151. At this time, the different scheme may be associated with an active period of the touch sensor. More specifically, the touch sensor may have a different active period according to whether or not the display unit 151 is activated to recognize a user's fingerprint applied to the fingerprint recognition sensor.

For an embodiment, when the display unit 151 is in an inactive state, the fingerprint recognition sensor may be activated with a preset specific period. In this case, the specific period may be a period corresponding to a time which is greater than zero. Furthermore, when the display unit 151 is in an active state, the fingerprint recognition sensor may be always operated in an active state. In other words, in this case, an activated period of the fingerprint recognition sensor may be a period having a time zero or very close to zero.

Whether or not the fingerprint sensor is activated may be determined using the power consumption of the fingerprint sensor. For example, the fingerprint recognition sensor may correspond to an inactive state when the power consumption of the fingerprint recognition sensor is less than a preset reference value based on zero, and may be referred to as an active state when the power consumption of the fingerprint recognition sensor is greater than a preset reference value based on zero.

When the display unit 151 is in an active state (hereinafter, referred to as an "active mode"), the fingerprint recognition sensor may continuously maintain the active state, and wait for a user's input for fingerprint recognition. On the contrary, when the display unit 151 is in an inactive state (hereinafter, referred to as a "doze mode"), the fingerprint recognition sensor may be activated for each a preset specific period.

On the other hand, as reducing a specific period in which the fingerprint recognition sensor is activated, a speed for sensing a user's fingerprint may increase, but accordingly power consumed by the fingerprint recognition sensor may also increase. On the contrary, as increasing the period in which the fingerprint recognition sensor is activated, a speed of sensing a user's fingerprint may decrease though power consumed by the fingerprint recognition sensor decreases.

Accordingly, the specific period may be set to enhance the efficiency of power consumption while a speed of sensing a user's fingerprint is fast enough to the extent of being unrecognizable by the user. For example, the specific period may be set such that the fingerprint recognition sensor is inactive and then active 20 times (Hz) per second.

On the other hand, while the display unit 151 is in an active state, the fingerprint recognition sensor may be also activated, and the active period (T) of the fingerprint recognition sensor in an active state may be zero or very close to zero. Otherwise, the period of the fingerprint recognition sensor while the fingerprint recognition sensor is in an active state may be shorter several times than a specific period set to activate the fingerprint recognition sensor while the display unit 151 is in an inactive state. In other words, the fingerprint recognition sensor may be activated for a different period of time according to whether or not the display unit 151 is activated.

On the other hand, when a preset touch input (for example, a touch input consecutively knocking a predetermined region within a reference period of time) is sensed in a doze mode in which the display unit 151 is deactivated and the fingerprint recognition sensor is periodically activated, the controller 180 may switch the doze mode to an active mode in which the display unit and fingerprint recognition sensor are activated. Otherwise, the fingerprint recognition sensor may be switched to an active state.

In addition, the fingerprint recognition sensor may be operated for a different period of time based on the status of the display unit 151. For example, the fingerprint recognition sensor may execute a doze mode when the display unit 151 is in a closed state, and execute an active mode when switching from the closed state to an open state.

Hereinafter, embodiments according to the present disclosure will be described with a case in which the fingerprint recognition sensor is disposed in the one region 233a, but the present disclosure may not be necessarily limited to this. In other words, the fingerprint recognition sensor may be disposed on a touch or push key disposed on a front surface or disposed in one region of the display unit 151 or the like.

Hereinafter, embodiments associated with a control method which can be implemented in the mobile terminal having the foregoing configuration will be described with reference to the attached drawings. It should be understood by those skilled in the art that the present invention can be embodied in other specific forms without departing from the concept and essential characteristics thereof.

Figure 3:
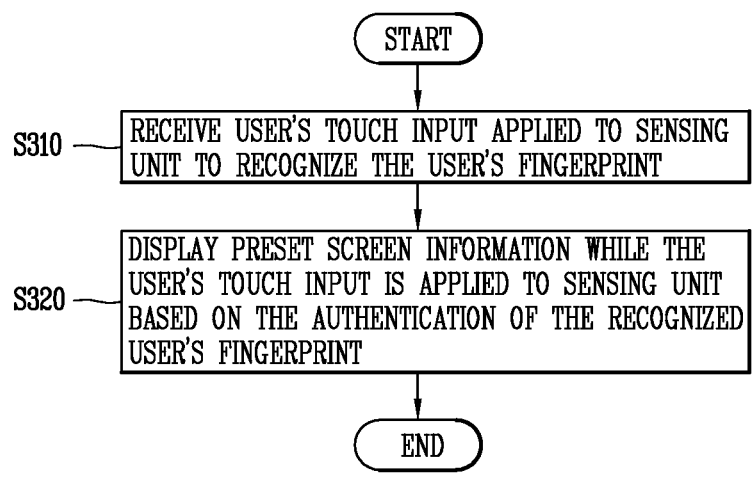
FIG. 3 is a flow chart for explaining a control method of a mobile terminal associated with the present disclosure.

FIG. 3 is a flow chart for explaining a control method of a mobile terminal associated with the present disclosure.

Referring to FIG. 3, first, the process (S310) of receiving a user's touch input applied to the sensing unit 140 to recognize the user's fingerprint is carried out.

Subsequently, the process (S320) of displaying preset screen information on the display unit 151 while the user's touch input is applied to the sensing unit 140 based on the authentication of the recognized user's fingerprint.

For an embodiment, the process S310 may include turning off a fingerprint recognition function of the sensing unit 140 when the display unit 151 is switched from an active state to an inactive state, and turning on the fingerprint recognition function of the sensing unit 140 based on a preset touch input applied to the sensing unit 140 while the display unit 151 is in an inactive state.

In other words, the fingerprint recognition sensor may be in an inactive state while the display unit is in an inactive state. In this state, when a preset user input is applied, the fingerprint recognition sensor may be switched to an inactive state. The detailed description thereof has been described in FIG. 2.

Furthermore, when the fingerprint recognition sensor is switched to an active state, a notification feedback for notifying this may be output. For example, the fingerprint recognition sensor that has been activated may be shown with the output of a notification sound or vibration, the output of a specific image effect, the blinking of LEDs or the like.

For another embodiment, the process S320 may include displaying the preset screen information on the display unit 151 while the user's touch input is applied to the sensing unit 140 based on the authentication of the recognized user's fingerprint while the display unit 151 is in an inactive state.

Specifically, when the user's fingerprint is authenticated, the display unit 151 in an inactive state may be switched to an active state, and screen information such as a message for notifying current time or the occurrence of an event or the like may be displayed while the user applies a touch input to the sensing unit 140.

For still another embodiment, the process S320 may include executing a control operation corresponding to a user's input applied to the preset screen information while the user's touch input is applied to the sensing unit 140.

Specifically, when the user applies a touch input to a message for notifying the occurrence of the event while at the same time applying a touch input to the sensing unit 140, part of the content of the message may be described.

For yet still another embodiment, the method may further include ending the display of the preset screen information based on the ending of a user's touch input applied to the sensing unit 140 to switch the display unit 151 to an inactive state.

Specifically, when the user releases his or her finger that has been in touch with the sensing unit 140, preset screen information such as a message for notifying the occurrence of the event or the like may disappear, and the display unit 151 may return to an inactive state again.

In other words, when the display unit 151 has been in an inactive state prior to applying a user's touch input to the sensing unit 140, it may return to an inactive state again.

For still yet another embodiment, the method may further include ending the display of the preset screen information based on the ending of a user's touch input applied to the sensing unit 140, and redisplaying screen information that has been displayed prior to displaying the preset screen information on the display unit 151.

In other words, when the user releases his or her finger that has been in touch with the sensing unit 140 in case that the display unit 151 has been in an active state prior to applying a user's touch input to the sensing unit 140, screen information that has been displayed on the display unit 151 may be redisplayed in the active state.

For yet still another embodiment, the process S320 may include displaying the preset screen information on the display unit 151 while the user's touch input is applied to the sensing unit 140 based on the authentication of the recognized user's fingerprint in a state that screen information corresponding to a locked state is displayed on the display unit 151.

For a subsequent embodiment, the method may further include ending the display of the preset screen information based on the ending of a user's touch input applied to the sensing unit 140, and redisplaying screen information corresponding to the locked state on the display unit 151.

Specifically, when the terminal is in a locked state in which a user's input is restricted, a lock screen corresponding thereto will be displayed. At this time, when a user's fingerprint is authenticated, preset screen information such as a message for notifying the occurrence of an event or the like may be displayed.

At this time, the locked state of the terminal may be released by the user's fingerprint authentication, and only the preset screen information may be displayed during a period of time in which a touch input is applied to the sensing unit 140 while maintaining the locked state. Accordingly, when the user releases his or her finger that has been in touch with the sensing unit 140, the lock screen may be redisplayed.

Hereinafter, a mobile terminal and a control method thereof according to the present disclosure will be described in more detail with reference to the accompanying drawings.

Figure 4:
FIG. 4 is a conceptual view for explaining a user's touch input when a fingerprint recognition sensor is disposed in one region of a rear input unit described in FIG. 2.

FIG. 4 is a conceptual view for explaining a user's touch input when a fingerprint recognition sensor is disposed in one region of a rear input unit described in FIG. 2.

Referring to FIG. 4, the fingerprint recognition sensor may be disposed in one region 233a of the rear input unit 233.

Specifically, the one region 233a may be provided at a portion easily touched with a user's forefinger on a rear surface of the terminal body. Furthermore, the illustrated one region 233a has a rectangular shape, but the present disclosure may not be necessarily limited to this, and may be modified to a circular shape, a polygonal shape, or the like, and may be formed in a shape recessed or protruded from a rear frame.

Furthermore, the one region 233a may not be necessarily limited to the illustrated size, and may be implemented in a size larger or smaller than the illustrated size, and the entire rear frame configured with a fingerprint recognition panel may be implemented.

As illustrated in FIG. 4, a user may continuously touch one region 233a of the rear input unit 233 with a finger for which fingerprint registration has been made. In this manner, when the user's fingerprint is recognized or authenticated while the user touches the one region 233a, preset screen information may be displayed on the screen 151. Then, when the user releases his or her finger from the one region 233a, the displayed screen information may disappear.

On the other hand, as described above, when the display unit 151 is in a inactive state, the fingerprint recognition sensor disposed in one region 233a of the rear input unit 233 may be also in an inactive state. At this time, the user may apply a preset touch input to the one region 233a to switch the fingerprint recognition sensor to an active state.

For an embodiment, when the user applies a short touch input to the one region 233a while the display unit 151 is in an inactive state, the fingerprint recognition sensor may be switched to an active state.

Then, the user may apply a touch input for displaying fingerprint authentication and preset screen information as described above. For a specific embodiment, when the display unit 151 is in an inactive state, the user may apply a short touch input to the one region 233a to switch the fingerprint recognition sensor to an active state, and then apply a long touch input (continuous touch input) to the one region 233a. Accordingly, a fingerprint may be recognized or authenticated to display preset screen information while the long touch input is applied thereto.

For still another embodiment, when the display unit 151 is in an inactive state, the fingerprint recognition sensor may be switched to an active state by the user's operation of applying a long touch input to the one region 233a, and fingerprint recognition may be carried out by the long touch input without an additional touch input.

The following embodiments will describe a case where the fingerprint recognition sensor is disposed on a rear surface as illustrated in FIG. 4, but the present disclosure may not be necessarily limited to this as described above. In other words, the fingerprint recognition sensor may be disposed on a touch or push key disposed on a front surface or may be also disposed in one region of the display unit 151 or the like.

For yet still another embodiment, in case that a finger is released from the fingerprint recognition sensor 233a subsequent to fingerprint recognition, security may be maintained for a predetermined period of time when the terminal is continuously held. To this end, a grip sensor may operate. Specifically, when a grip state is released by an operation of putting the terminal down on the floor or handing it over to another person, a state of maintaining security may be released.

As described above, the controller 180 may turn off the fingerprint recognition function of the sensing unit 140 when the display unit 151 is switched from an active state to an inactive state, and turn on the fingerprint recognition function of the sensing unit 140 based on a preset touch input applied to the sensing unit 140 while the display unit 151 is in an inactive state.

Furthermore, the controller 180 may display the preset screen information on the display unit 151 while the user's touch input is applied to the sensing unit 140 based on the authentication of the recognized user's fingerprint while the display unit 151 is in an inactive state.

Subsequently, the controller 180 may end the display of the preset screen information based on the ending of a user's touch input applied to the sensing unit 140 to switch the display unit 151 to an inactive state.

For another embodiment, the controller 180 may end the display of the preset screen information based on the ending of a user's touch input applied to the sensing unit 140, and redisplays screen information that has been displayed prior to displaying the preset screen information on the display unit 151.

Figure 5:
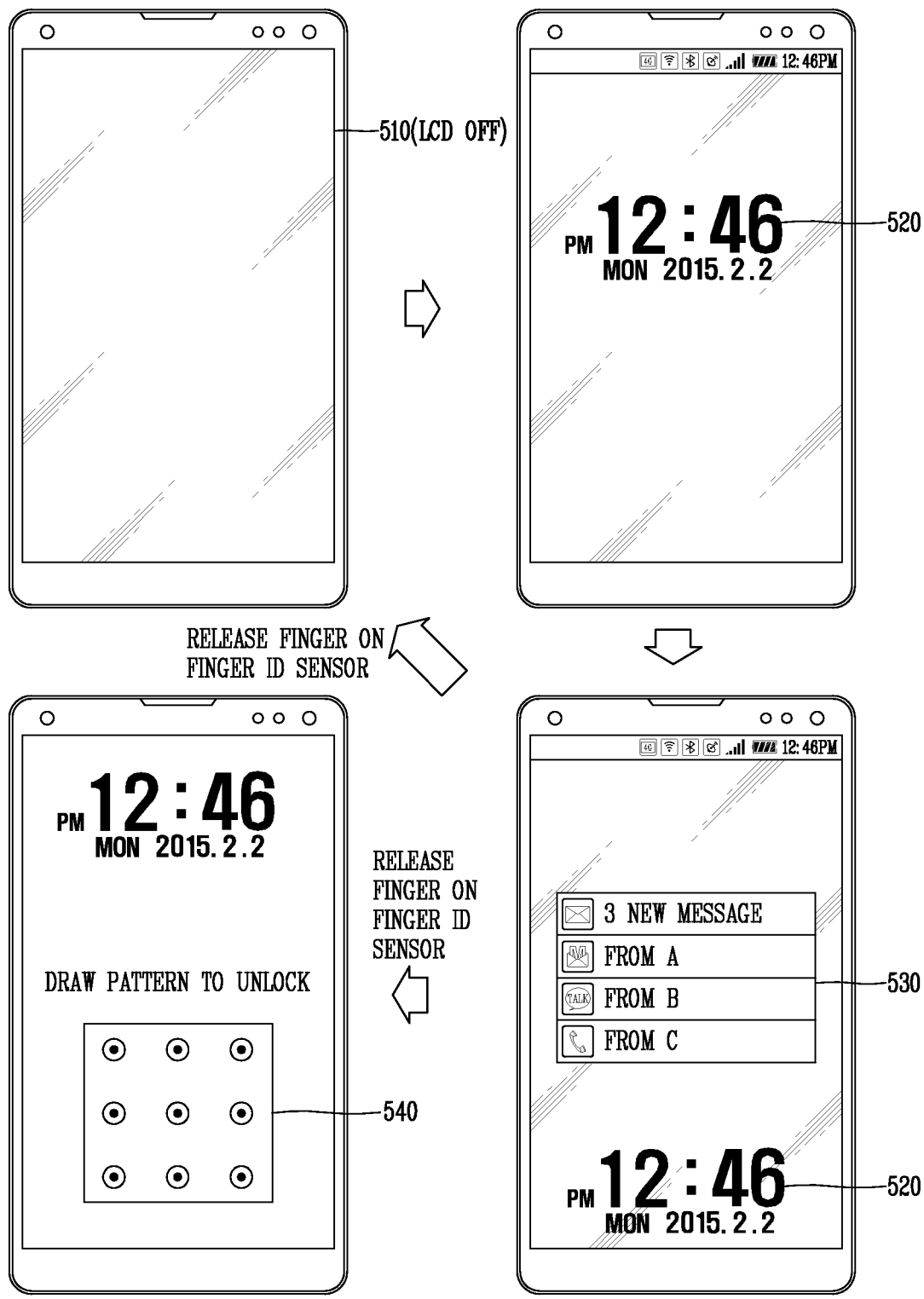
FIGS. 5 through 7 are conceptual views illustrating an embodiment of screen information displayed when a fingerprint is authenticated while a display unit is in an inactive state.
Figure 6:
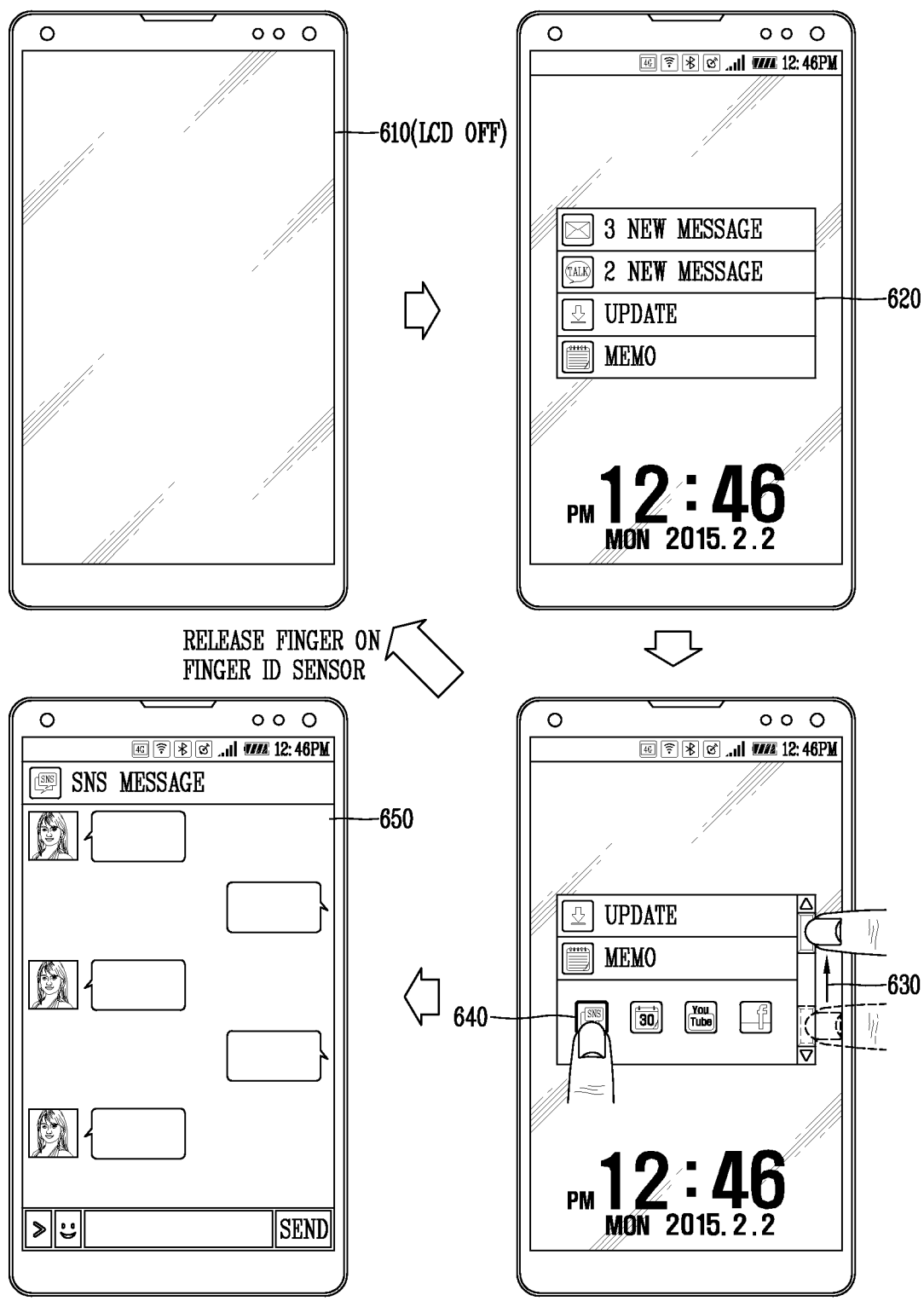
Figure 7:
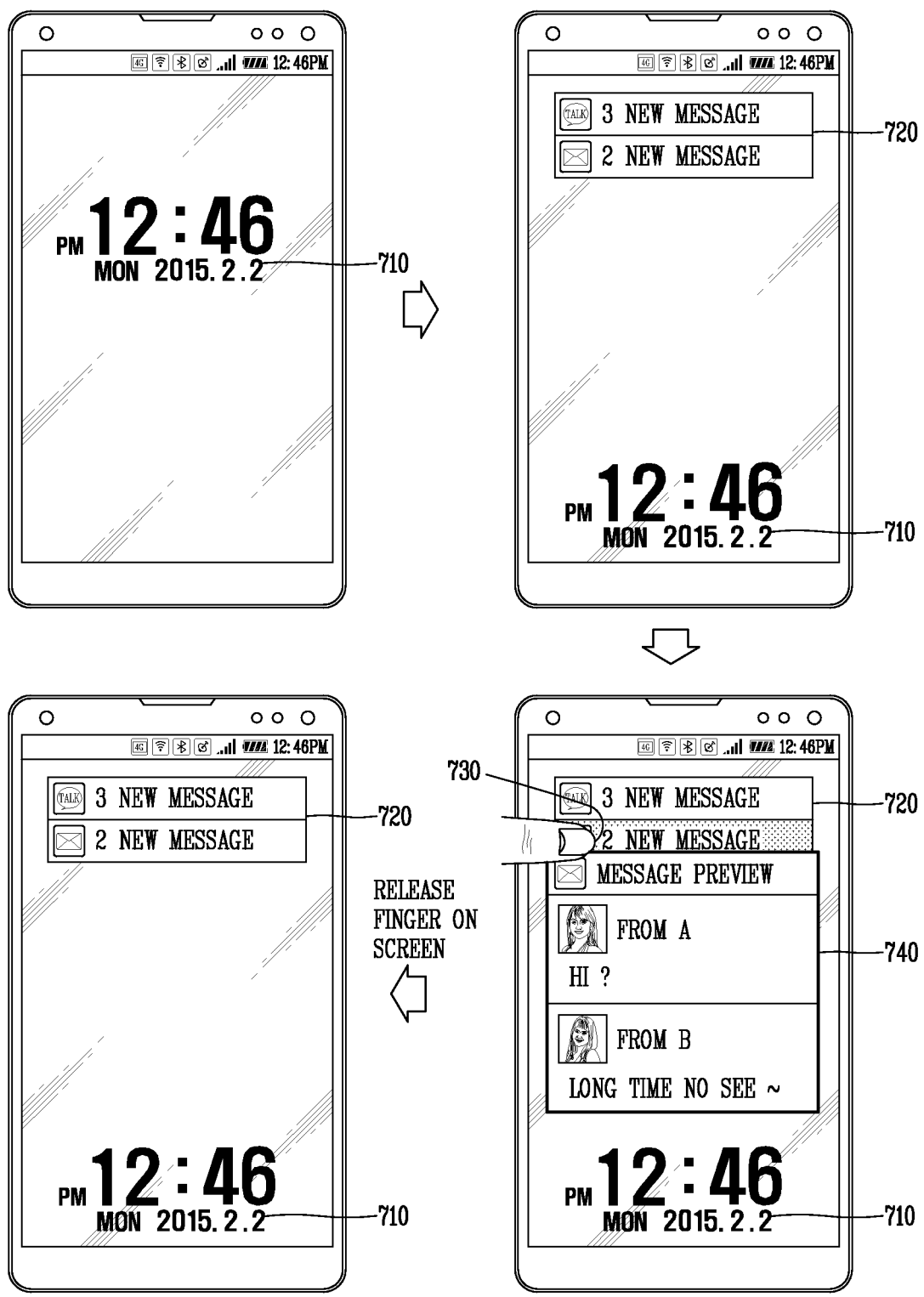

FIGS. 5 through 7 are conceptual views illustrating an embodiment of screen information displayed when a fingerprint is authenticated while a display unit is in an inactive state.

Referring to FIG. 5, when the display unit 151 is in an inactive state 510, a user's long touch input may be applied to one region 233a disposed with the fingerprint recognition sensor as illustrated in FIG. 4. Due to such a user input, the fingerprint recognition sensor may be switched to an active state.

Subsequently, when the user continuously applies a long touch input to the one region 233a, screen information 520 indicating date, time and the like may be displayed for a preset period of time. For example, the screen information 520 may be displayed while the recognized fingerprint is authenticated or for a period of time capable of allowing the user to check date, time and the like.

Next, when fingerprint authentication is completed, preset screen information may be displayed. For an embodiment, notification messages 530 indicating events occurred may be displayed. Specifically, messages indicating an update of an application, a notification message of an application, a mail received, an SNS message received, a missed call received, and the like may be displayed.

The notification messages 530 may be displayed while the user continuously applies a touch input to the one region 233a. In other words, when the user releases his or her finger that has been in touch with the one region 233a, notification messages 530 that have been displayed disappear, and return to an initial inactive state 510.

For another embodiment, the notification messages 530 that have been displayed may disappear, and screen information 520 indicating the date, time and the like may be displayed again.

For still another embodiment, the notification messages 530 that have been displayed may disappear, and a screen 540 for lock release may be displayed. Specifically, a screen for entering a password, a pattern, a PIN or the like may be displayed.

For yet still another embodiment, when a PIN, a password, a pattern or the like is set to lock, the lock may be released by fingerprint authentication. Accordingly, the notification messages 530 that have been displayed may disappear, and a lock released home screen may be displayed.

On the other hand, the controller 180 may carry out a control operation corresponding to a user's input applied to the preset screen information while the user's touch input is applied to the sensing unit 140.

Furthermore, the controller 180 may display information associated with an object on the display unit 151 based on a preset touch input applied to the object included in the preset screen information while the user's touch input is applied to the sensing unit 140.

Referring to FIG. 6, when the display unit 151 is in an inactive state 610, a user's long touch input may be applied to one region 233a disposed with the fingerprint recognition sensor as illustrated in FIG. 4. Due to such a user input, the fingerprint recognition sensor may be switched to an active state.

Subsequently, in case that the user continuously applies a long touch input to the one region 233a, preset screen information may be displayed when fingerprint authentication is completed. For another embodiment, notification messages 620 indicating events occurred may be displayed. Specifically, messages indicating an update of an application, a notification message of an application, a mail received, an SNS message received, a missed call received, and the like may be displayed.

The notification messages 620 may be sequentially displayed according to a preset order or priority order. Otherwise, a notification message corresponding to the most recently occurred event may be displayed at the uppermost portion according to the order of event occurrences.

At this time, the user may apply a scroll input 630 in a horizontal or vertical direction to check a list of the notification messages 620. Icons corresponding to applications may be displayed by the scroll input 630, and the user may apply a touch input to one icon 640 of them. Furthermore, the icons corresponding to applications may be set in advance or selected and set by the user.

The scroll input 630 and an input for touching an icon 640 may be applied at the same time with a touch input described in FIG. 4. For another embodiment, the user may apply the scroll input 630 and an input for touching the icon 640 with his or her right hand while holding the terminal with his or her left hand and touching the one region 233a with his or her left forefinger.

An execution screen 650 of an application corresponding to the icon 640 may be displayed based on the application of an input for touching the icon 640.

For another embodiment, the user may touch the icon 640 corresponding to a messenger application with his right finger while holding the terminal with his or her left hand and touching the one region 233a with his or her left forefinger. Accordingly, the execution screen 650 of a messenger application may be displayed.

On the other hand, as illustrated in FIG. 5, a list of the notification messages 620, icons corresponding to applications, an execution screen 650 of an application may be displayed while the user continuously applies a touch input to the one region 233a. In other words, when the user releases his or her finger that has been in touch with the one region 233a, a list of the notification messages 620 that have been displayed, icons corresponding to applications, an execution screen 650 of an application disappear, and return to an initial inactive state 610.

Referring to FIG. 7, as illustrated in FIG. 5, when the display unit 151 is in an inactive state, a user's long touch input may be applied to one region 233a disposed with the fingerprint recognition sensor. Due to such a user input, the fingerprint recognition sensor may be switched to an active state.

Subsequently, when the user continuously applies a long touch input to the one region 233a, screen information 71 indicating date, time and the like may be displayed for a preset period of time. For example, the screen information 710 may be displayed while the recognized fingerprint is authenticated or for a period of time capable of allowing the user to check date, time and the like.

Next, when fingerprint authentication is completed, preset screen information may be displayed. For an embodiment, notification messages 720 indicating events occurred may be displayed. Specifically, messages indicating an update of an application, a notification message of an application, a mail received, an SNS message received, a missed call received, and the like may be displayed.

At this time, when the user applies a long touch input to a notification message 730 of notifying a message received event of a message application, a popup window 740 that shows part of the received message content may be displayed while the long touch input is applied.

Specifically, part of the received message content may be displayed in a preview mode. Accordingly, the user may check part of the recently received message content without entering a message application.

Even in this case, an input for touching the notification message 730 may be applied at the same time with a touch input described in FIG. 4. For an embodiment, the user may apply an input for touching the notification message 730 with his or her right hand while holding the terminal with his or her left hand and touching the one region 233a with his or her left forefinger. In this state, when the user releases his or her finger that touches the notification message 730, the screen returns again to a previous state. In other words, notification messages 720 indicating events occurred may be redisplayed.

In case that the user checks part of the receive message content in the foregoing preview mode, when the user releases his or her finger that touches the notification message 730 to redisplay notification messages 720 indicating an event occurred, a number of unread messages may be displayed in the same manner as a previous state.

For example, when n messages are received on a message application and the received messages are checked in the preview mode, the user may release his or her finger that has been in touch with the notification message 730. Accordingly, notification messages 720 indicating events occurred may be redisplayed. At this time, a number of messages received from the message application may be displayed as n in the same manner.

For another embodiment, when the user applies a short touch input to a message 730 indicating a message received event of a message application, the message application may be carried out (to enter the message application) and display the execution screen thereof. In this case, when the user releases his or her finger that has been in touch with the one region 233a, an execution screen of the messenger application disappears, and returns to an initial inactive state.

Figure 8:
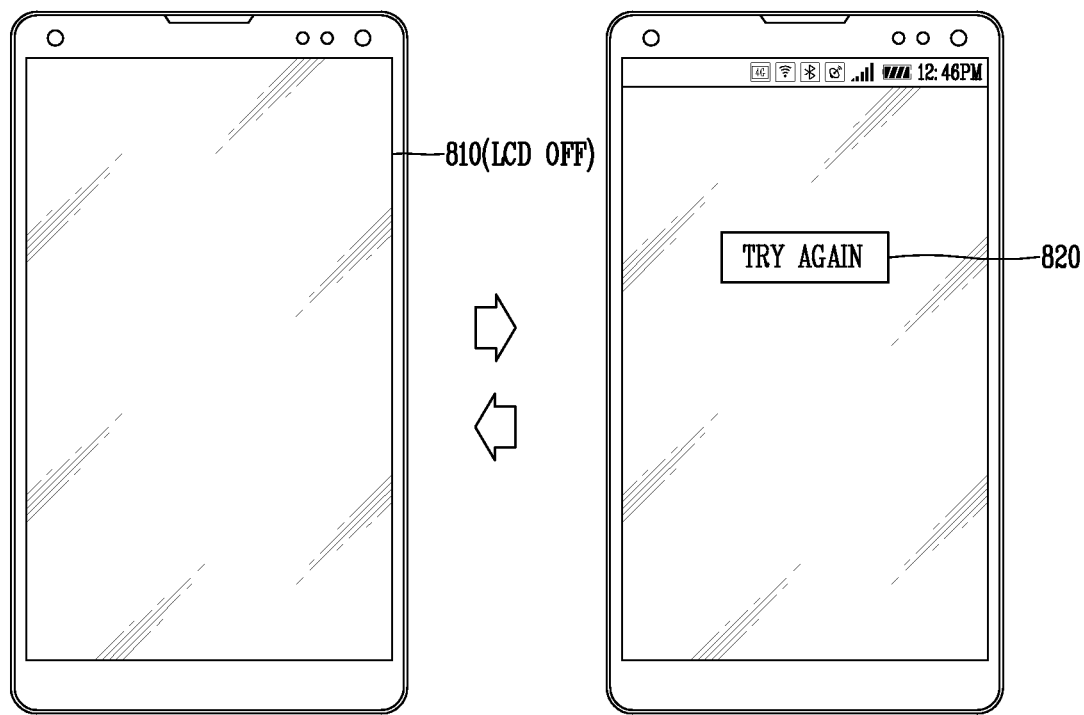
FIG. 8 is a conceptual view illustrating an embodiment of screen information displayed when fingerprint authentication is failed while the display unit is in an inactive state.

FIG. 8 is a conceptual view illustrating an embodiment of screen information displayed when fingerprint authentication is failed while the display unit is in an inactive state.

Referring to FIG. 8, when the display unit 151 is in an inactive state 810, a user's long touch input may be applied to one region 233a disposed with the fingerprint recognition sensor as illustrated in FIG. 4. Due to such a user input, the fingerprint recognition sensor may be switched to an active state.

Accordingly, when the recognized fingerprint is not authenticated, a message indicating that fingerprint authentication has been failed or a message 820 for requesting a fingerprint input again may be displayed. Then, the display unit 151 may return to a previous inactive state 810.

On the other hand, the controller 180 may display the preset screen information on the display unit 151 while the user's touch input is applied to the sensing unit 140 based on the authentication of the recognized user's fingerprint in a state that screen information corresponding to a locked state is displayed on the display unit 151.

Furthermore, the controller 180 may end the display of the preset screen information and redisplay screen information corresponding to the locked state on the display unit 151 based on the ending of a user's touch input applied to the sensing unit 140.

For another embodiment, the controller 180 may end the display of the preset screen information based on the ending of a user's touch input applied to the sensing unit 140, and redisplays screen information that has been displayed prior to displaying the preset screen information on the display unit 151.

Figure 9:
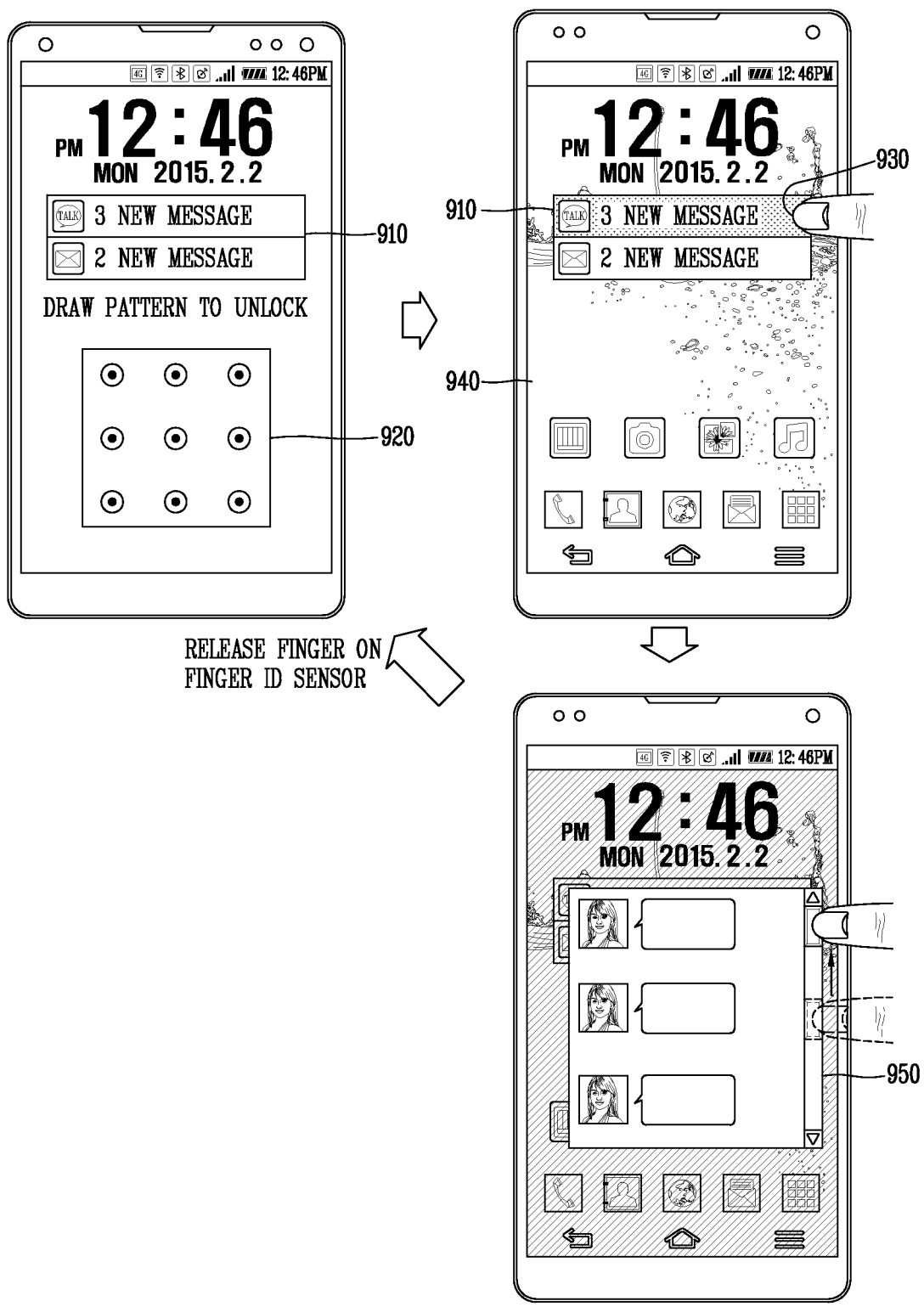
FIG. 9 is a conceptual view illustrating an embodiment of screen information displayed when a fingerprint is authenticated while the display unit is in an active state.

FIG. 9 is a conceptual view illustrating an embodiment of screen information displayed when a fingerprint is authenticated while the display unit is in an active state.

Referring to FIG. 9, a user's long touch input may be applied to one region 233*a* disposed with the fingerprint recognition sensor as illustrated in FIG. 4 in a state that a notification message 910 indicating the occurrence of an event and a pattern input window 920 with screen information for lock release are displayed. At this time, the display unit 151 is in an active state, and thus the fingerprint recognition sensor may be also in an active state.

Accordingly, when a user's fingerprint recognized in the fingerprint recognition sensor is authenticated, the lock setting of the terminal may be released. In other words, the pattern input window 920 that has been displayed may disappear and a lock released home screen 940 may be displayed.

Subsequently, when the user applies a touch input to one 930 of notification messages 910 of event occurrences, preset screen information may be displayed in response to an event to which the touch input is applied. Even in this case, an input for touching the notification message 930 may be applied at the same time with a touch input described in FIG. 4. For an embodiment, the user may apply an input for touching the notification message 930 with his or her right hand while holding the terminal with his or her left hand and touching the one region 233*a* with his or her left forefinger.

For an embodiment, when the user applies a touch input to a message 930 indicating that a new message has been received in a messenger, an additional screen window that shows part of the received message content in a preview mode may be displayed.

For another embodiment, when the user applies a touch input to the message 930 indicating that a new message has been received in a messenger, an execution screen 950 of the messenger application may be displayed.

Accordingly, the user may apply a scroll input in a vertical or horizontal direction to check the entire or part of the received message content.

In this state, when the user releases his or her finger that has been in touch with one region 233*a* disposed with the fingerprint recognition sensor, screen information that has been displayed on the screen 151 prior to applying a touch input to the one region 233*a* may be redisplayed. Specifically, the execution screen 950 of the messenger application may disappear, and a notification message 910 indicating the occurrence of an event, a pattern input window 920 with screen information for lock release and the like may be redisplayed.

For still another embodiment, when the user releases his or her finger that has been in touch with one region 233*a* disposed with the fingerprint recognition sensor, screen information prior to displaying the execution screen 950 of the messenger application may be redisplayed. Specifically, the execution screen 950 of the messenger application may disappear, and a lock released home screen 940 may be displayed.

On the other hand, the controller 180 may display preset screen information on the display unit 151 to be displayed in connection with a preset application during fingerprint recognition while the user's touch input is applied to the sensing unit 140 based on the authentication of the recognized user's fingerprint in a state that an execution screen of the preset application is displayed on the display unit 151.

Figure 10:
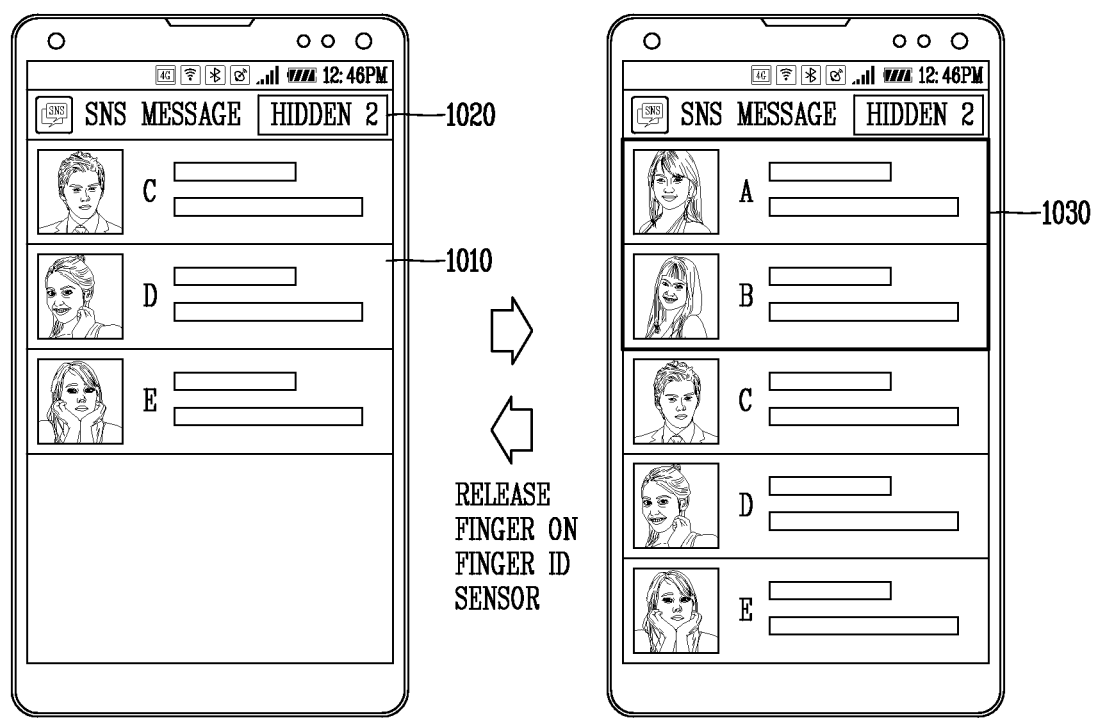
FIG. 10 is a conceptual view illustrating an embodiment in which preset security content is displayed when a fingerprint is authenticated.

FIG. 10 is a conceptual view illustrating an embodiment in which preset security content is displayed when a fingerprint is authenticated.

Referring to FIG. 10, when an event of a message received that can be checked with fingerprint authentication occurs in a state that an execution screen 1010 of a message application is displayed, an icon 1020 indicating this may be displayed.

Accordingly, when the user applies a long touch input to the fingerprint recognition sensor 233*a* to recognize and authenticate the user's fingerprint, preset screen information may be displayed. For an embodiment, messages 1030 received from preset security senders (A, B) may be displayed while the user applies a long touch input to the fingerprint recognition sensor 233*a*.

Subsequently, when the user releases his or her finger that has been in touch with the fingerprint recognition sensor 233*a*, it returns again to an execution screen 1010 of an initial message application.

For another embodiment, when a message is received from a preset security sender during the execution of an email application, an icon indicating this may be displayed. Accordingly, when the user applies a touch input to the fingerprint recognition sensor to carry out fingerprint recognition and authentication, the message received from the security sender may be displayed while the touch input is applied to the fingerprint recognition sensor.

For still another embodiment, when there exists a preset security memo during the execution of a memo application, an icon indicating this may be displayed. Accordingly, when the user applies a touch input to the fingerprint recognition sensor to carry out fingerprint recognition and authentication, the content of the security memo may be displayed while the touch input is applied to the fingerprint recognition sensor.

For yet still another embodiment, when there exists a preset security image during the execution of a photo album application, an icon indicating this may be displayed. Accordingly, when the user applies a touch input to the fingerprint recognition sensor to carry out fingerprint recognition and authentication, the security image may be displayed while the touch input is applied to the fingerprint recognition sensor.

Figure 11:
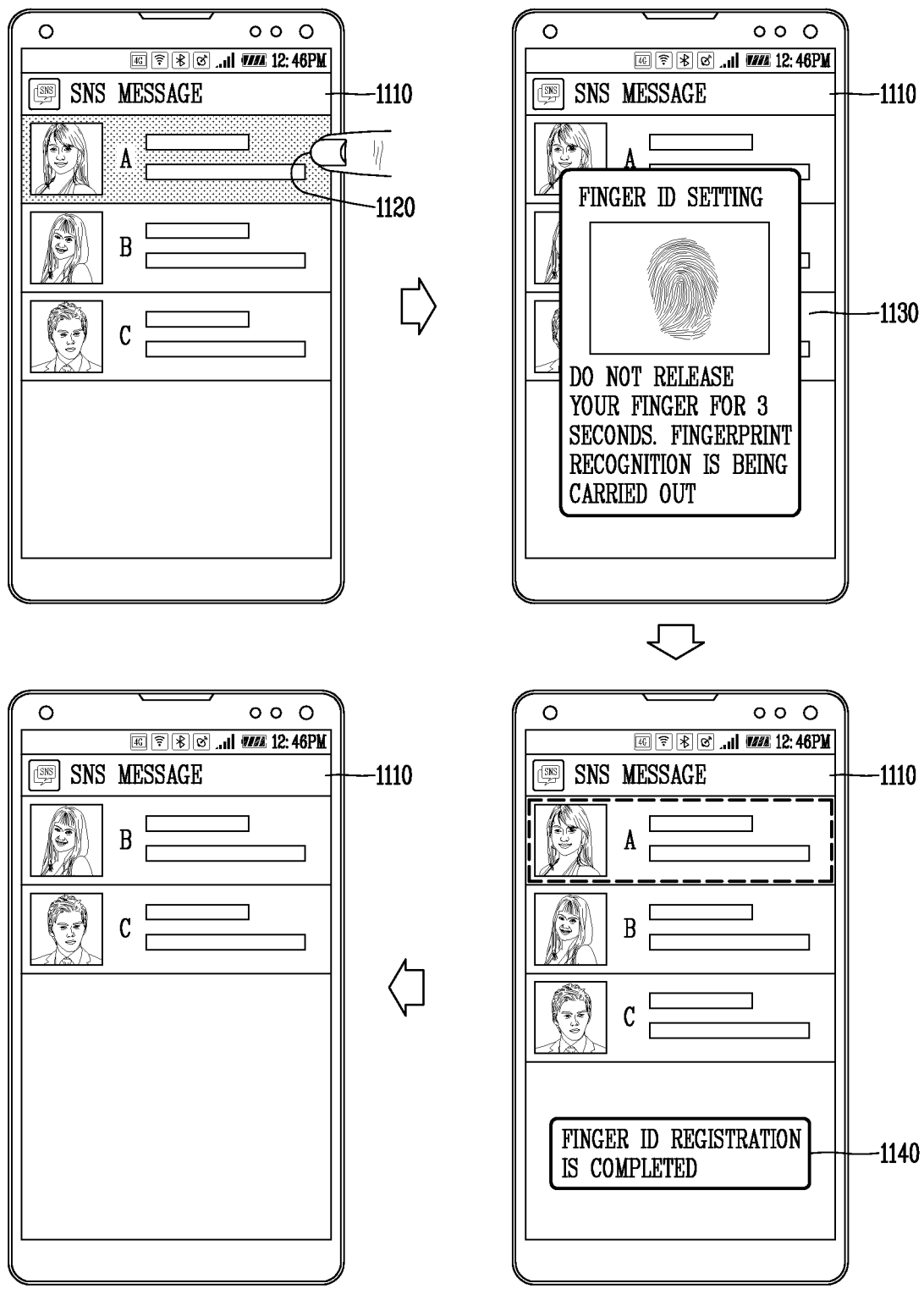
FIG. 11 is a conceptual view illustrating an embodiment of setting security content to be displayed with fingerprint authentication.

FIG. 11 is a conceptual view illustrating an embodiment of setting security content to be displayed with fingerprint authentication.

Referring to FIG. 11, the user may apply a touch input to the fingerprint recognition sensor 233*a* in a state that an execution screen 1110 of a message preview is displayed due to the execution of a message application, and then apply a touch input to select one 1120 of preview messages.

Accordingly, a guide window 1130 for fingerprint registration may be displayed. For example, a guide message for maintaining a touch input state for several seconds may be displayed on the guide window 1130.

When a fingerprint is registered according to the guide message, a popup window 1140 indicating that fingerprint registration is completed may be displayed. Furthermore, a preview message 1120 to which the touch input is applied may be set to a displayable message only when the fingerprint is authenticated.

As a result, it may disappear from a message preview execution screen 1110, and the relevant message may be displayed only when the registered fingerprint authentication is received. Accordingly, desired messages may be individually set to lock according to the message sender, message content and the like.

Using the foregoing method, received emails, text messages, memos, images may be set to lock for each content to be displayed when a fingerprint is authenticated.

On the other hand, the controller 180 may execute a preset application based on the authentication of the recognized user's fingerprint, and displays an execution screen of the preset application on the display unit 151 while the user's touch input is applied to the sensing unit 140.

Furthermore, the controller 180 may store information generated during the execution of the application in a memory that is readable when the fingerprint is authenticated.

Figure 12:
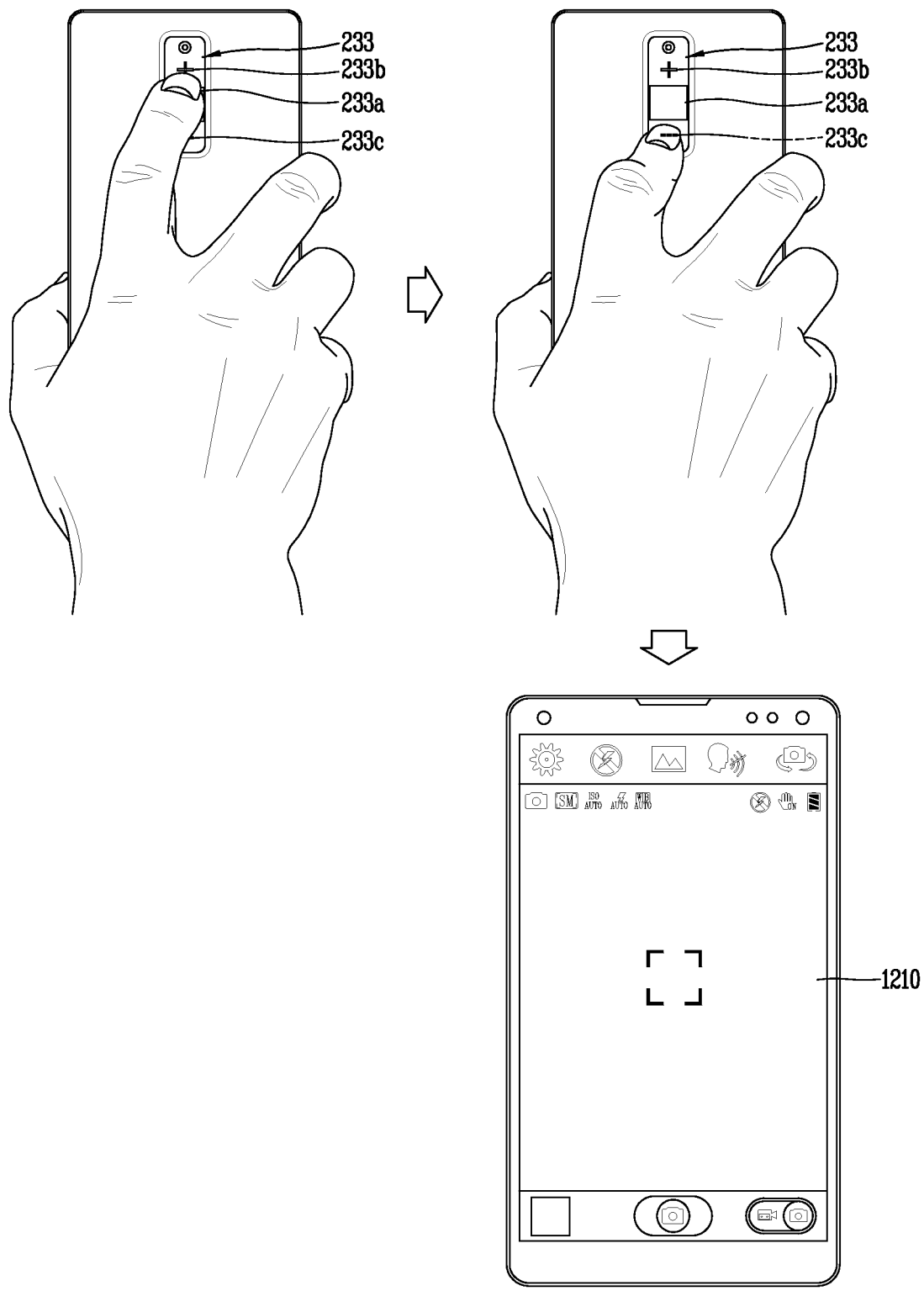
FIG. 12 is a conceptual view illustrating an embodiment of executing a preset application by fingerprint authentication.

FIG. 12 is a conceptual view illustrating an embodiment of executing a preset application by fingerprint authentication.

Referring to FIG. 12, when the user applies a touch input for fingerprint recognition to one region 233a of the rear input unit 233 for a predetermined period of time, and then applies a touch input to a volume up or volume down region 233b, 233c disposed at the rear input unit 233, a camera application may be carried out. Accordingly, an execution screen 1210 of a camera application for capturing a photo may be displayed on a front display unit 151.

For example, the user may apply a touch input (long touch input) to the fingerprint recognition sensor 233a with his or her left or right forefinger, and then applies a touch input for rubbing his or her forefinger in an upward or downward direction to execute a camera application.

For an embodiment, when the user captures an image in a state of touching the fingerprint recognition sensor 233a, the captured image may be stored in an additional memory (folder) that is readable when the fingerprint is authenticated. If the user captures an image in a state that his or her finger that has been in touch with the fingerprint recognition sensor 233a is released, the captured image may be stored in a memory (folder) that is readable without user authentication.

For another embodiment, when the user applies a touch input to the volume up or volume down region 233b, 233c while at the same time continuously applying a touch input to the fingerprint recognition sensor 233a, a camera application may be carried out.

For example, the user may apply a touch input to the volume up or volume down region 233b, 233c with his or her left or right forefinger while applying a touch input (long touch input) to the fingerprint recognition sensor 233a with his finger of the opposite hand to carry out a camera application.

At this time, when the finger is released from the fingerprint recognition sensor 233a prior to the execution of the camera application, the captured image may be stored in a memory (folder) that is readable without user authentication. On the contrary, when the finger is released from the fingerprint recognition sensor 233a subsequent to the execution of the camera application, the captured image may be stored in an additional memory (folder) that is readable when the fingerprint is authenticated.

On the other hand, the controller 180 may display preset visual information in one region of the display unit 151 in a preset inactive state to be displayed in response to a preset first touch input in response to at least one of a fingerprint sensed on the fingerprint recognition sensor 233a and the first touch input, while the user's touch input is applied to the sensing unit 140, based on the authentication of the recognized user's fingerprint while the display unit 151 is in an inactive state and the first touch input applied to the display unit 151 in the inactive state.

As described above, the following embodiment relates to a method of displaying visual information on the display unit 151 in an inactive state while a finger is in touch with the one region 233a.

For an embodiment, the controller 180 may display at least one icon for executing a preset function in a preset one region to be displayed in response to the direction of a sensed swipe input based on the sensing of the swipe input in a vertical or horizontal direction on the display unit 151 in the inactive state.

FIGS. 13A through 13D are conceptual views for explaining an embodiment in which an icon is displayed according to the direction of a touch input.

Figure 13A:
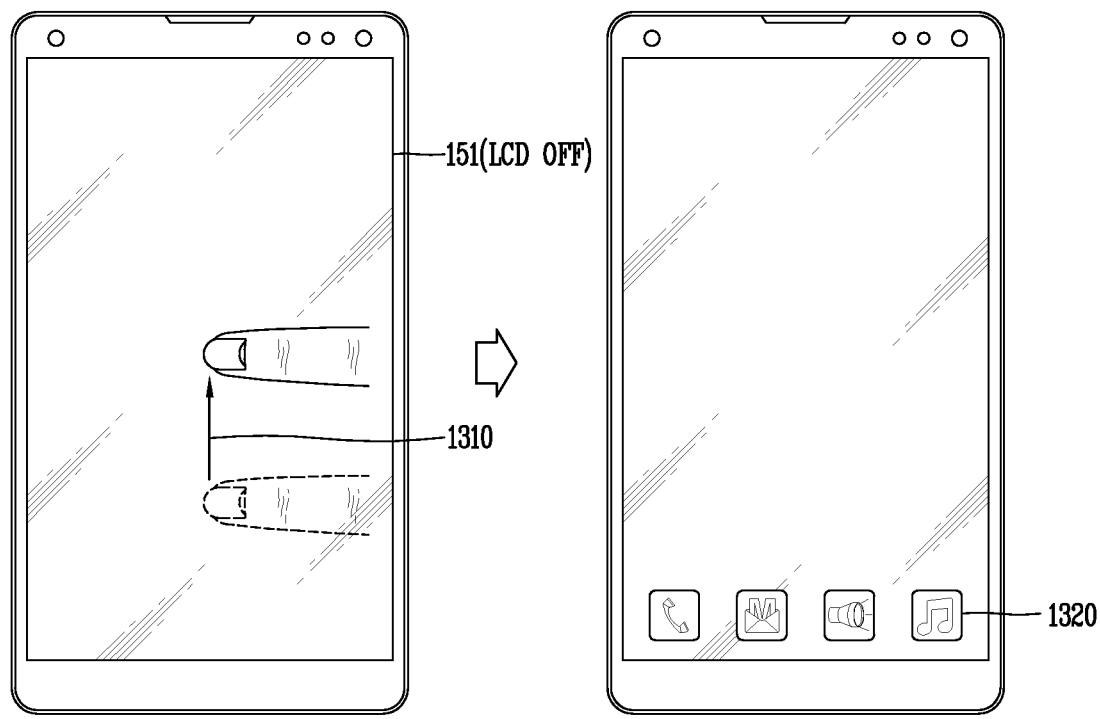
FIGS. 13A through 13D are conceptual views for explaining an embodiment in which an icon is displayed according to the direction of a touch input.

Referring to FIG. 13A, when a swipe input 1310 in an upward direction is applied to the display unit 151 in an inactive state, the icons of preset applications may be displayed in a lower region 1320 of the display unit 151 in the inactive state.

Figure 13B:
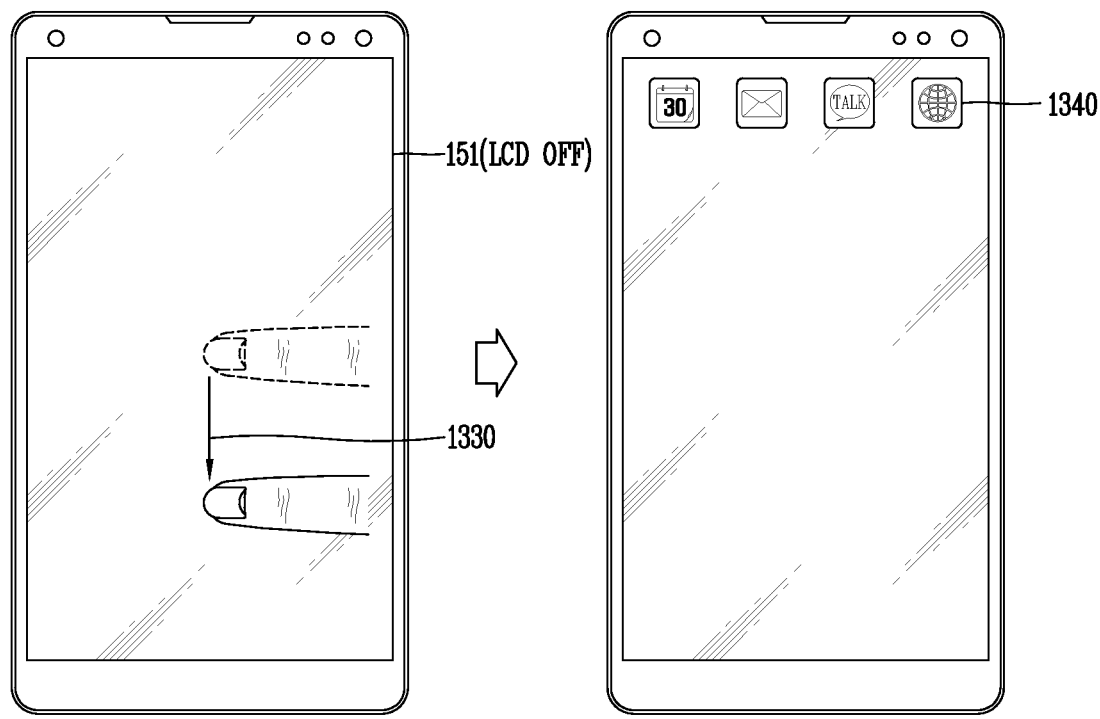

Referring to FIG. 13B, when a swipe input 1330 in a downward direction is applied to the display unit 151 in an inactive state, the icons of preset applications may be displayed in an upper region 1340 of the display unit 151 in the inactive state.

Figure 13C:
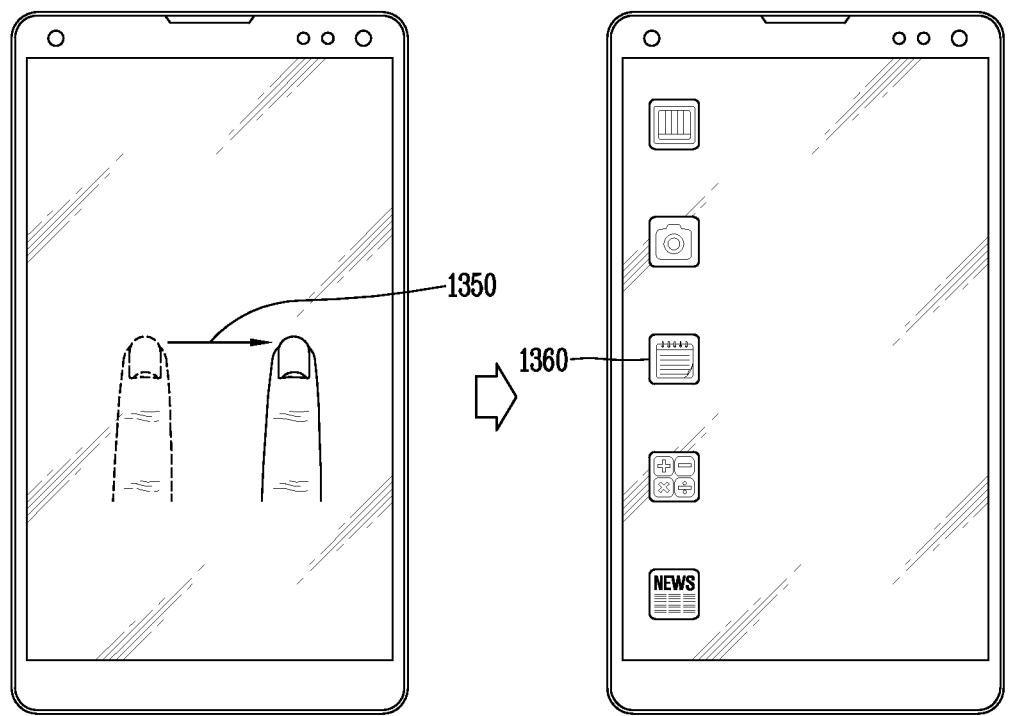

Referring to FIG. 13C, when a swipe input 1350 in a right direction is applied to the display unit 151 in an inactive state, the icons of preset applications may be displayed in a left region 1360 of the display unit 151 in the inactive state.

Figure 13D:
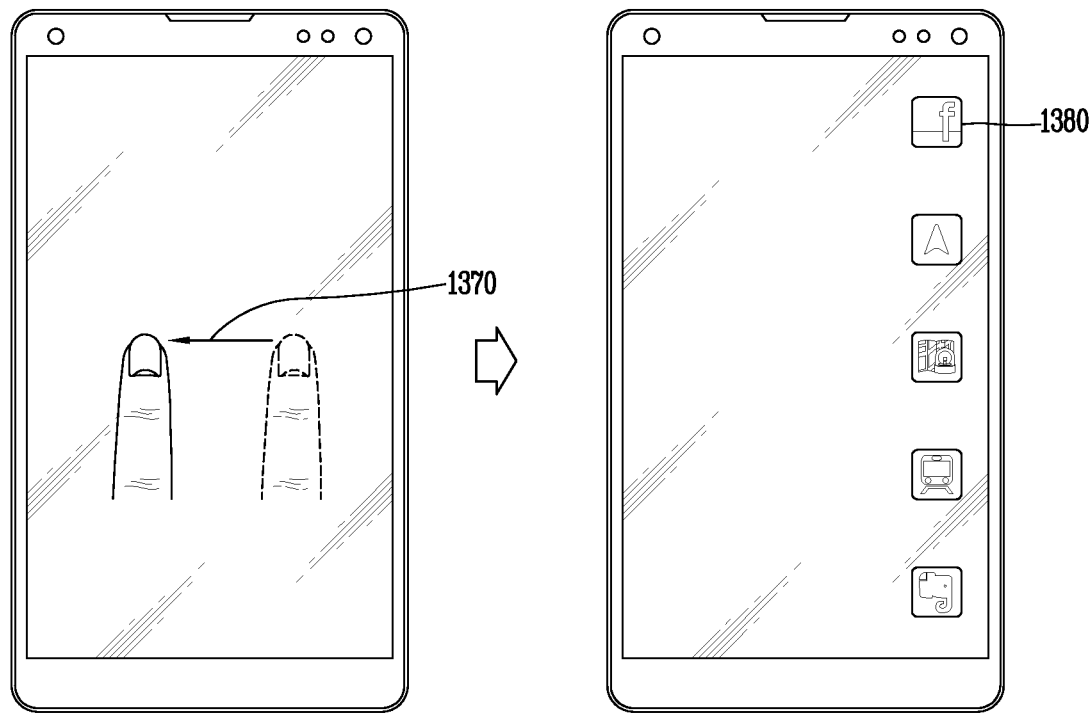

Referring to FIG. 13D, when a swipe input 1370 in a left direction is applied to the display unit 151 in an inactive state, the icons of preset applications may be displayed in a right region 1380 of the display unit 151 in the inactive state.

The icons of applications displayed in FIGS. 13A through 13D may be icons of applications frequently used by a user such as a camera, a calculator, a messenger, a flashlight, a schedule application, and the like.

For an embodiment, when user authentication is failed, the icons of applications requiring security may not be displayed. For example, the icons of applications in which personal information is likely exposed during the execution thereof may not be displayed.

Furthermore, the icons of different applications may be displayed according to the mode of a touch input applied thereto. For example, the icons of applications displayed when a swipe input 1310 in an upward direction and a swipe input 1330 in a downward direction are applied may be partially or entirely different.

On the other hand, the controller 180 may switch the display unit 151 again to the inactive state based on a preset touch input sensed on the display unit 151 in a state that at least one object is displayed.

Figure 14:
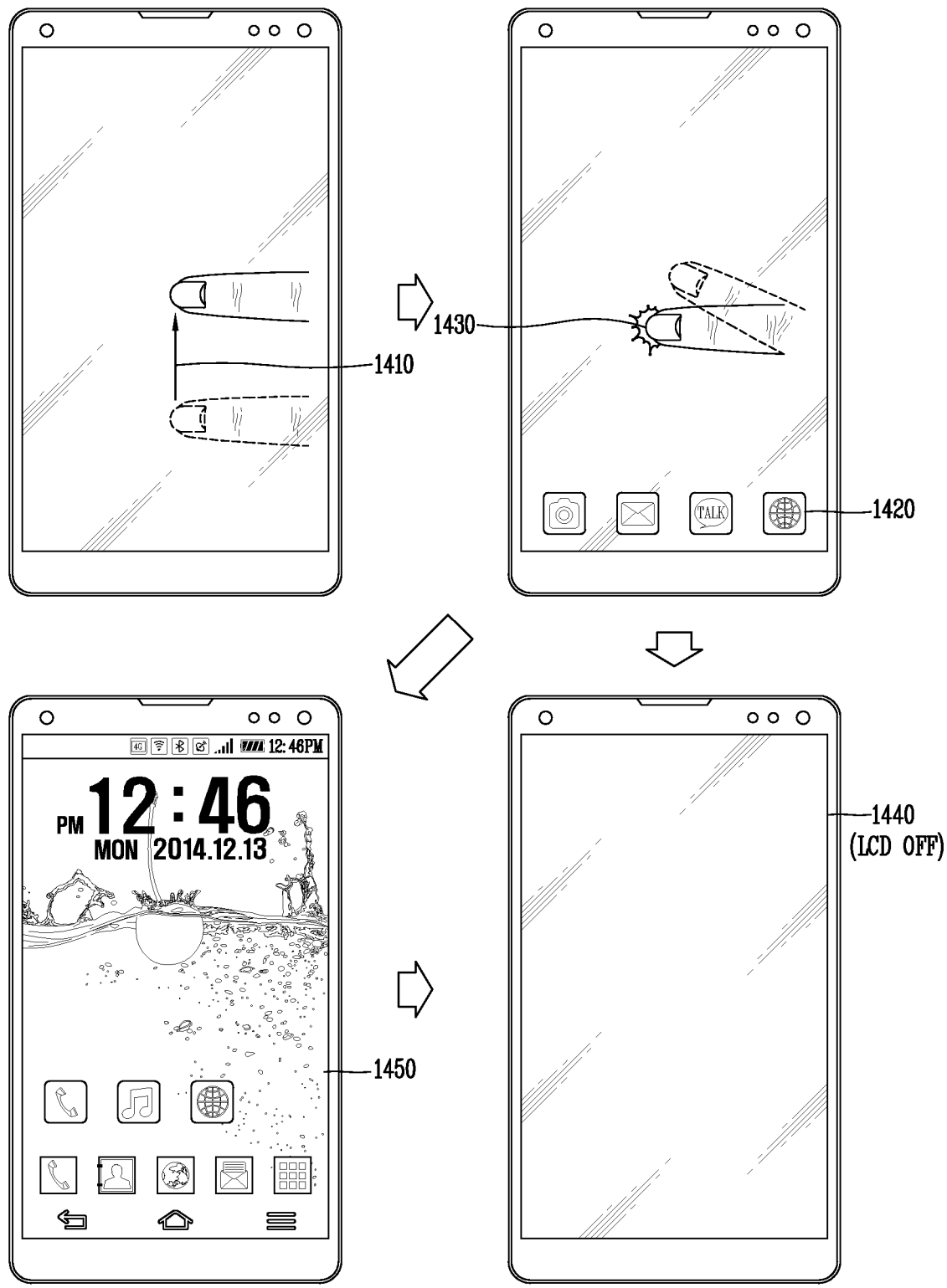
FIG. 14 is a conceptual view for explaining an embodiment in which the display of an icon is ended.

FIG. 14 is a conceptual view for explaining an embodiment in which the display of an icon is ended.

Referring to FIG. 14, when a swipe input 1410 in an upward direction is applied to the display unit 151 in an inactive state, the icons of preset applications may be displayed in a lower region 1420 of the display unit 151 in the inactive state.

An input 1430 for tapping the display unit 151 may be applied in a state that the icons of applications are displayed as described above. Accordingly, the display unit 151 may be switched again to an inactive state 1440.

For another embodiment, a home screen 1450 may be displayed by a tap input 1430 applied to the display unit 151. At this time, when the terminal is set to lock, screen information for lock release may be displayed on the home screen.

On the other hand, the controller 180 may display the screen information of function execution corresponding to an object to which the touch input is applied on the display unit 151 based on a preset touch input applied to one of the at least one object.

Figure 15:
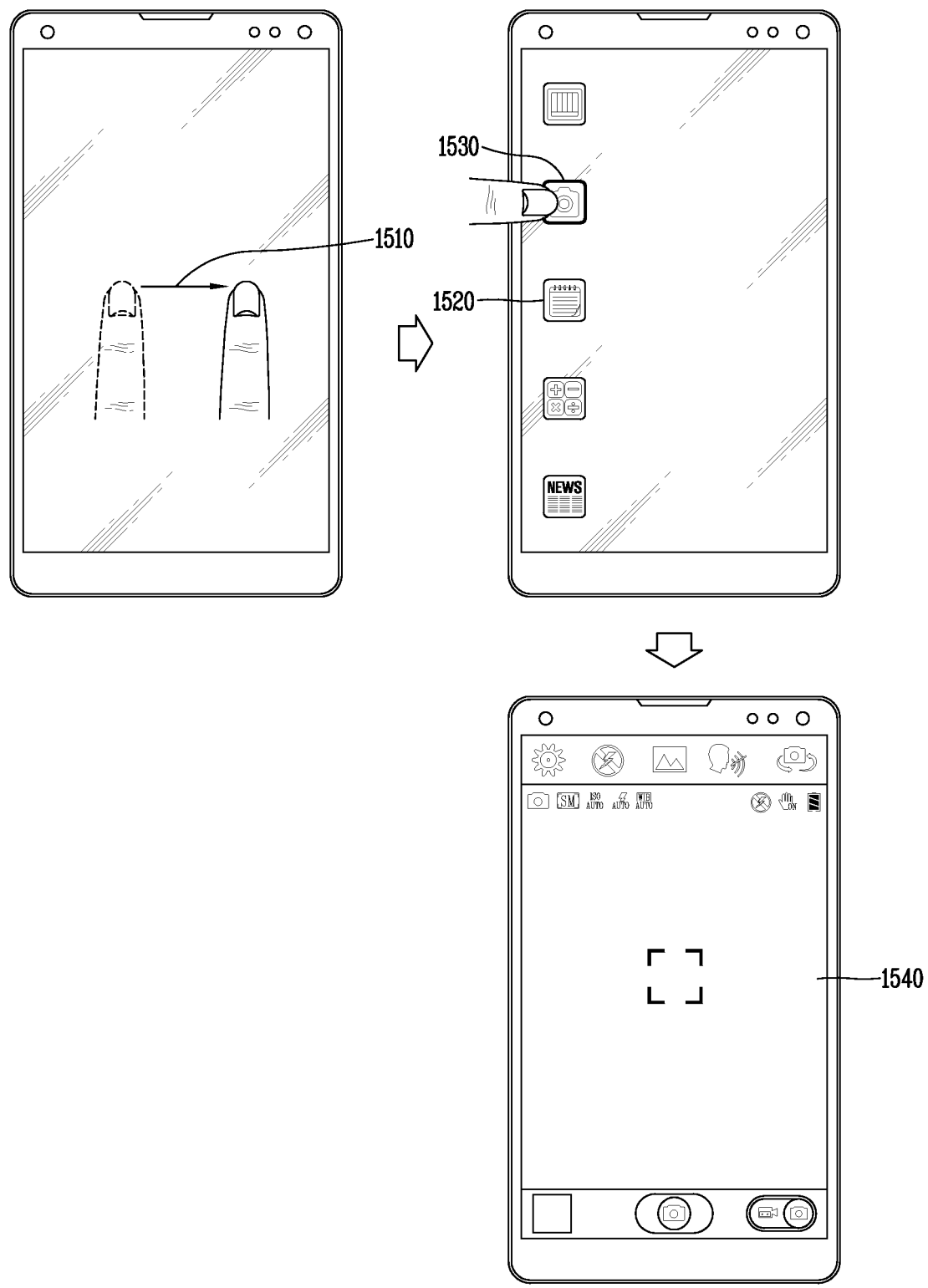
FIG. 15 is a conceptual view for explaining an embodiment in which a function corresponding to a displayed icon is carried out.

FIG. 15 is a conceptual view for explaining an embodiment in which a function corresponding to a displayed icon is carried out.

Referring to FIG. 15, when a swipe input 1510 in a right direction is applied to the display unit 151 in an inactive state, the icons of preset applications may be displayed in a left region 1520 of the display unit 151 in the inactive state.

When a touch input is applied to an icon 1530 of a camera application which is one of the icons of application displayed as described above, an execution screen 1540 of the camera application may be displayed.

Figure 16A:
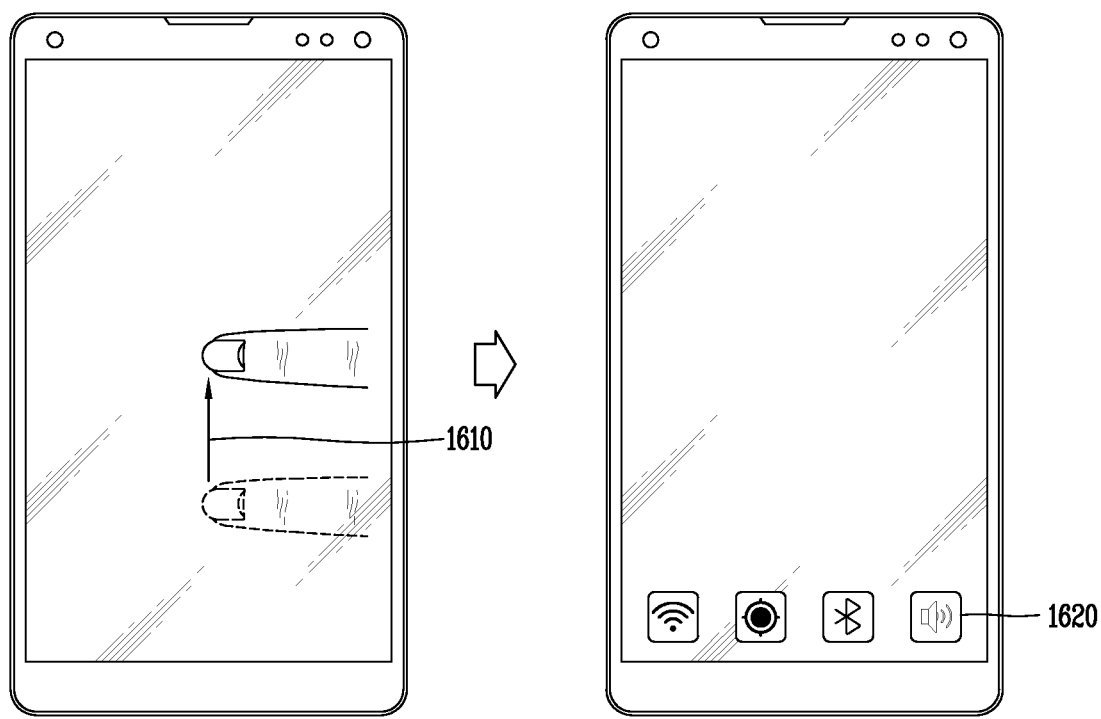
FIGS. 16A and 16B are conceptual views for explaining an embodiment in which an icon is displayed according to the mode of a touch input.
Figure 16B:
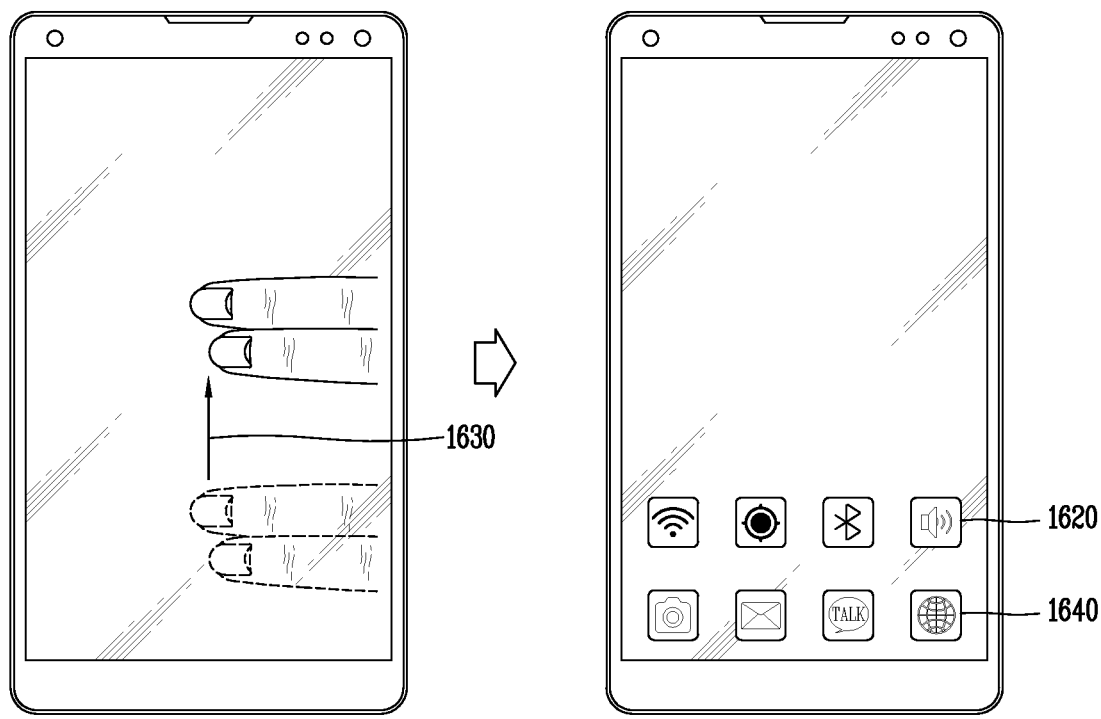

For still another embodiment, FIGS. 16A and 16B are conceptual views for explaining an embodiment in which an icon is displayed according to the mode of a touch input.

Referring to FIG. 16A, when a swipe input 1610 in an upward direction using a finger is applied to the display unit 151 in an inactive state, the icons of preset applications may be displayed in a lower region 1420 of the display unit 151 in the inactive state.

Icons 1620 for functional settings on the terminal may include icons for setting Wi-Fi, Bluetooth, GPS, vibration, sound notification, and the like.

Referring to FIG. 16B, when a swipe input 1630 in an upward direction using two fingers is applied to the display unit 151 in an inactive state, icons 1620 for setting the functions of the terminal and the icons 1640 of preset applications may be displayed in a lower region of the display unit 151 in the inactive state.

For an embodiment, the icons of displayed applications may be icons of applications frequently used by a user such as a camera, a calculator, a messenger, a flashlight, a schedule application, and the like.

For an embodiment, when user authentication is failed, the icons of applications requiring security may not be displayed. For example, the icons of applications in which personal information is likely exposed during the execution thereof may not be displayed.

In other words, according to the embodiments of FIGS. 16A and 16B, a different number or type of icons may be displayed according to the input touch mode.

On the other hand, the controller 180 may display at least one preset object in one region of the display unit 151 in the inactive state to be displayed in response to whether or not a fingerprint sensed on the fingerprint recognition sensor 140 is authenticated based on a preset touch input sensed on the display unit 151 in the inactive state and a touch input for fingerprint input sensed on the fingerprint recognition sensor 140.

Regarding the foregoing embodiment, the fingerprint recognition sensor 140 may be incorporated into the display unit 151 or user input unit 123. Specifically, the fingerprint recognition sensor 140 may be incorporated into the one region 233a disposed on a rear surface of the terminal.

The following embodiments will be described with a case where the fingerprint recognition sensor is disposed on a rear surface 233a as illustrated in FIG. 4, but the present disclosure may not be necessarily limited to this as described above. In other words, the fingerprint recognition sensor may be disposed on a touch or push key disposed on a front surface or disposed in one region of the display unit 151 or the like.

Figure 17:
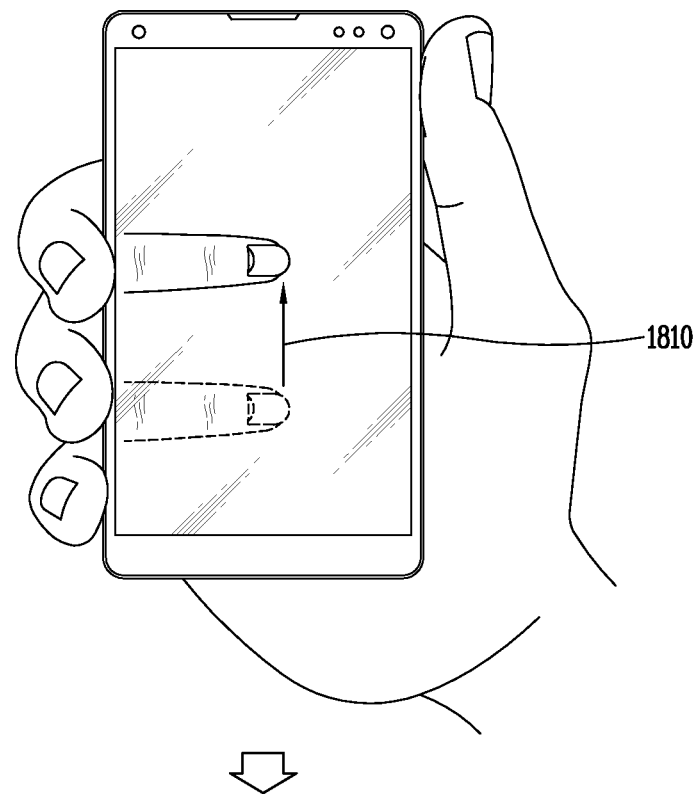
FIG. 17 is a conceptual view for explaining an embodiment in which an icon is displayed by a touch operation for a fingerprint input and a touch input applied to the display unit in an inactive state.
Figure 17:
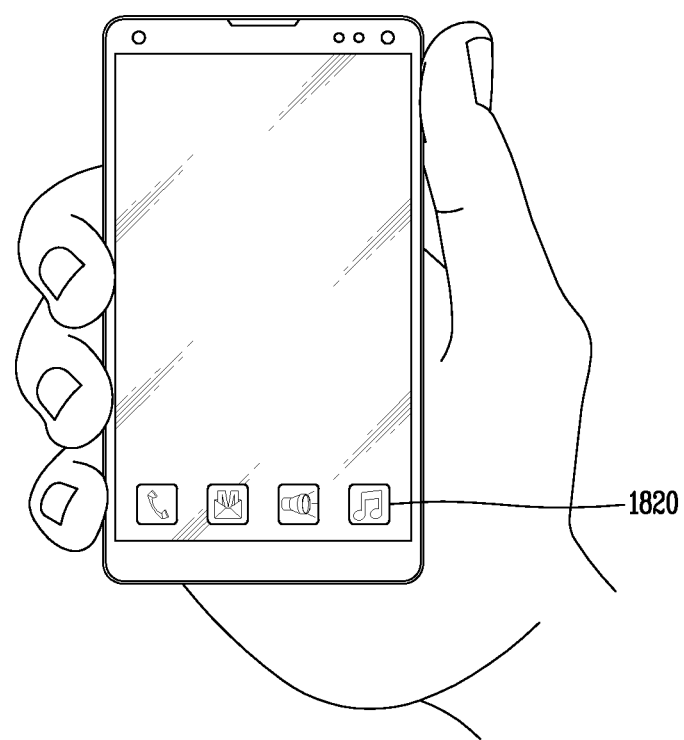

FIG. 17 is a conceptual view for explaining an embodiment in which an icon is displayed by a touch operation for a fingerprint input and a touch input applied to the display unit in an inactive state.

Referring to FIG. 17, the user may apply a touch input with his or her right forefinger to one region 233a on a rear surface into which the fingerprint recognition sensor is incorporated while holding the terminal. At the same time or in a sequential manner, a swipe input 1810 in an upward direction may be applied thereto.

Accordingly, when a fingerprint sensed on the fingerprint recognition sensor is authenticated, the icons 1820 of applications set to be displayed when the fingerprint is authenticated may be displayed in a lower region of the display unit 151 in an inactive state.

For an embodiment, the icons of applications in which personal information is likely exposed during the execution thereof may be also displayed. On the contrary, when fingerprint authentication is failed, the icons of applications in which there is no danger of exposing personal information during the execution thereof may be displayed.

For a specific embodiment, the icons of applications in which there is a danger of exposing personal information such as a messenger, a memo, a mail, like may be displayed when a fingerprint is authenticated, and the icons of applications in which there is no danger of exposing personal information such as a camera, a calculator, a flashlight, and the like may be displayed when fingerprint authentication is failed.

Figure 18:
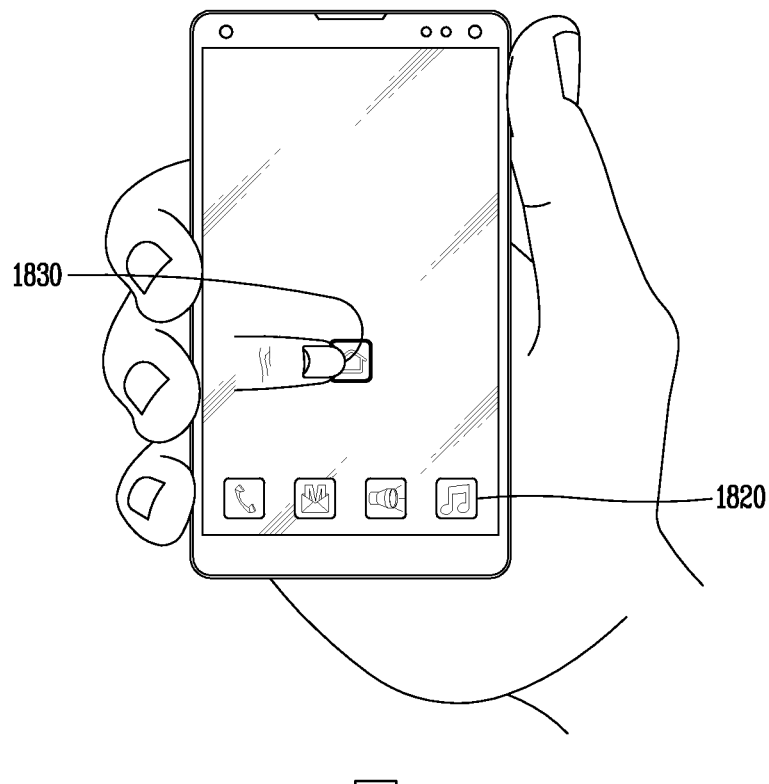
FIG. 18 is a conceptual view for explaining an embodiment in which the display of an icon is ended by a touch operation for a fingerprint input and a touch input applied to the display unit in an inactive state.
Figure 18:
Figure 18:
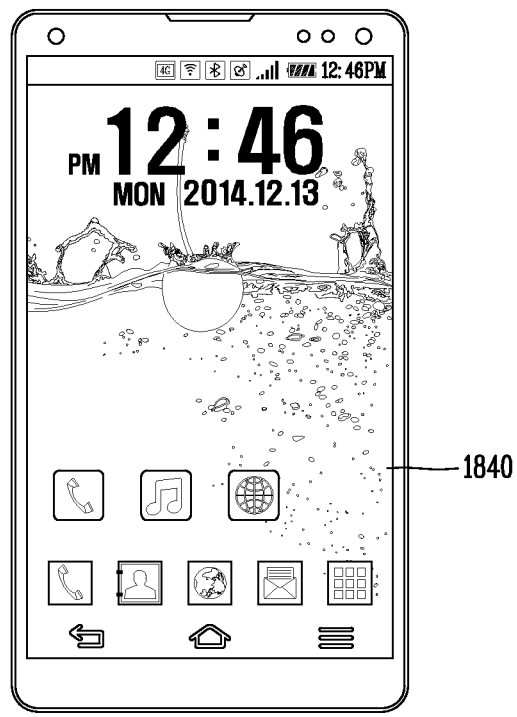

FIG. 18 is a conceptual view for explaining an embodiment in which the display of an icon is ended by a touch operation for a fingerprint input and a touch input applied to the display unit in an inactive state.

Referring to FIG. 18, as illustrated in FIG. 17, a touch input may be applied to a home icon 1830 displayed in a state that the icons 1820 of applications set to be displayed when a fingerprint is authenticated are displayed in a lower region of the display unit 151 in an inactive state.

Accordingly, a home screen 1840 released from the lock setting may be displayed on the display unit 151. For an embodiment, even when the terminal is set to lock, such as a pattern, a password, a PIN, and the like, the lock setting may be released by fingerprint authentication to display the home screen 1840 released from the lock setting on the display unit 151.

On the other hand, the controller 180 may display at least one preset object in one region of the display unit 151 in the inactive state to be displayed in response to whether or not a fingerprint sensed on the fingerprint recognition sensor 233a is authenticated and the mode of the touch input based on a touch input for fingerprint input sensed on the fingerprint recognition sensor 233a.

Figure 19A:
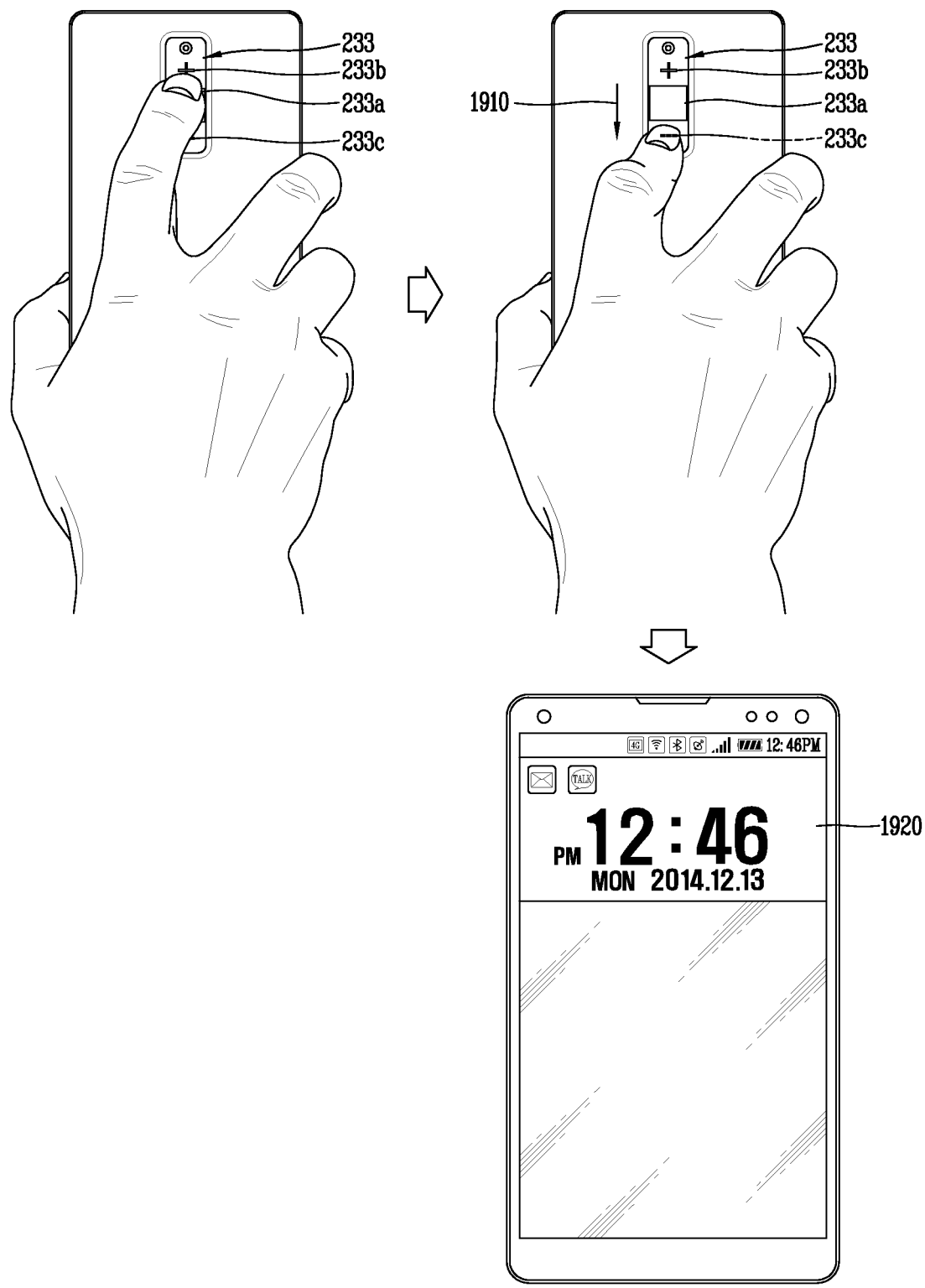
FIGS. 19A through 19C are conceptual views for explaining an embodiment in which an icon is displayed according to a touch operation for a fingerprint input and whether or not the fingerprint is authenticated.
Figure 19B:
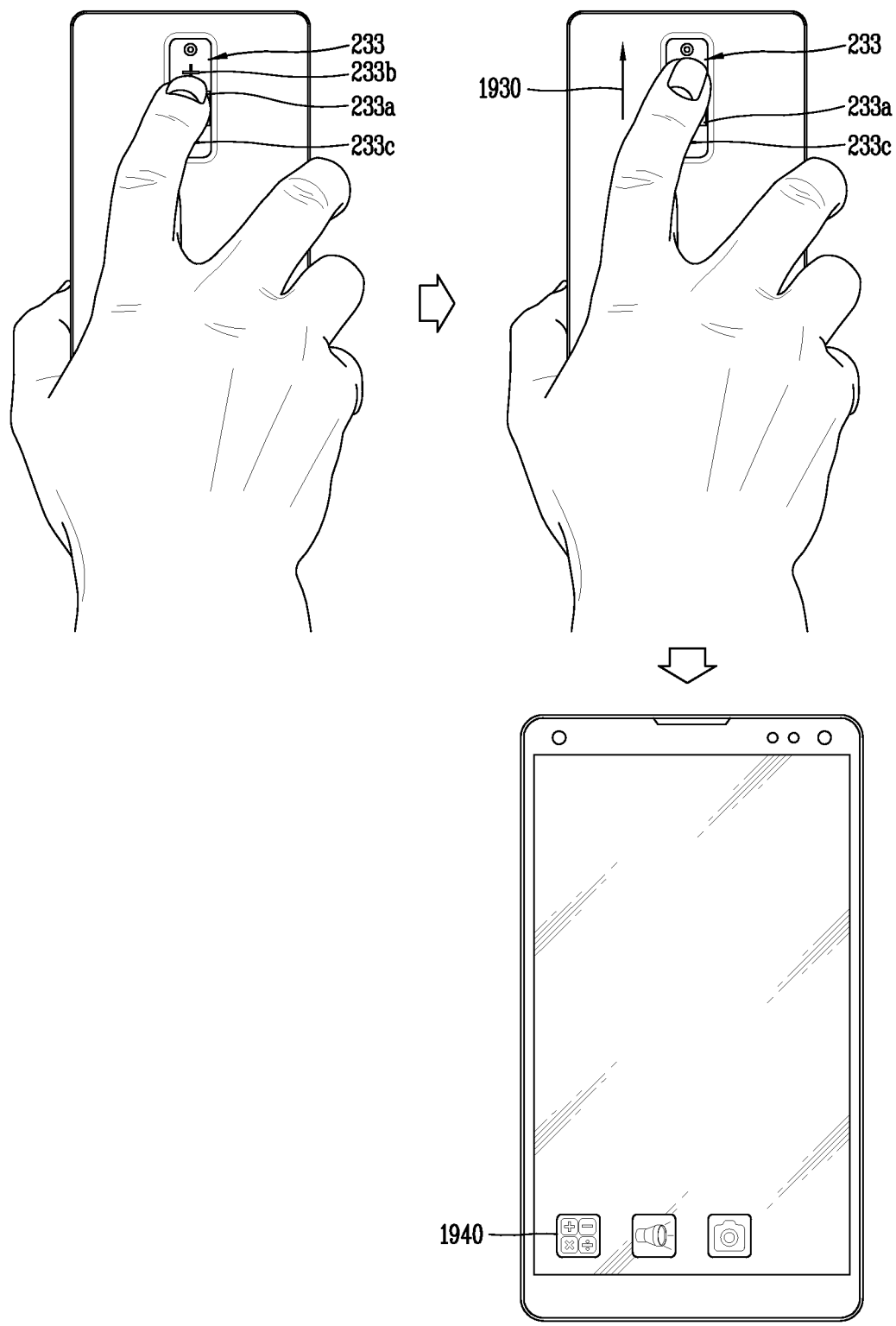
Figure 19C:
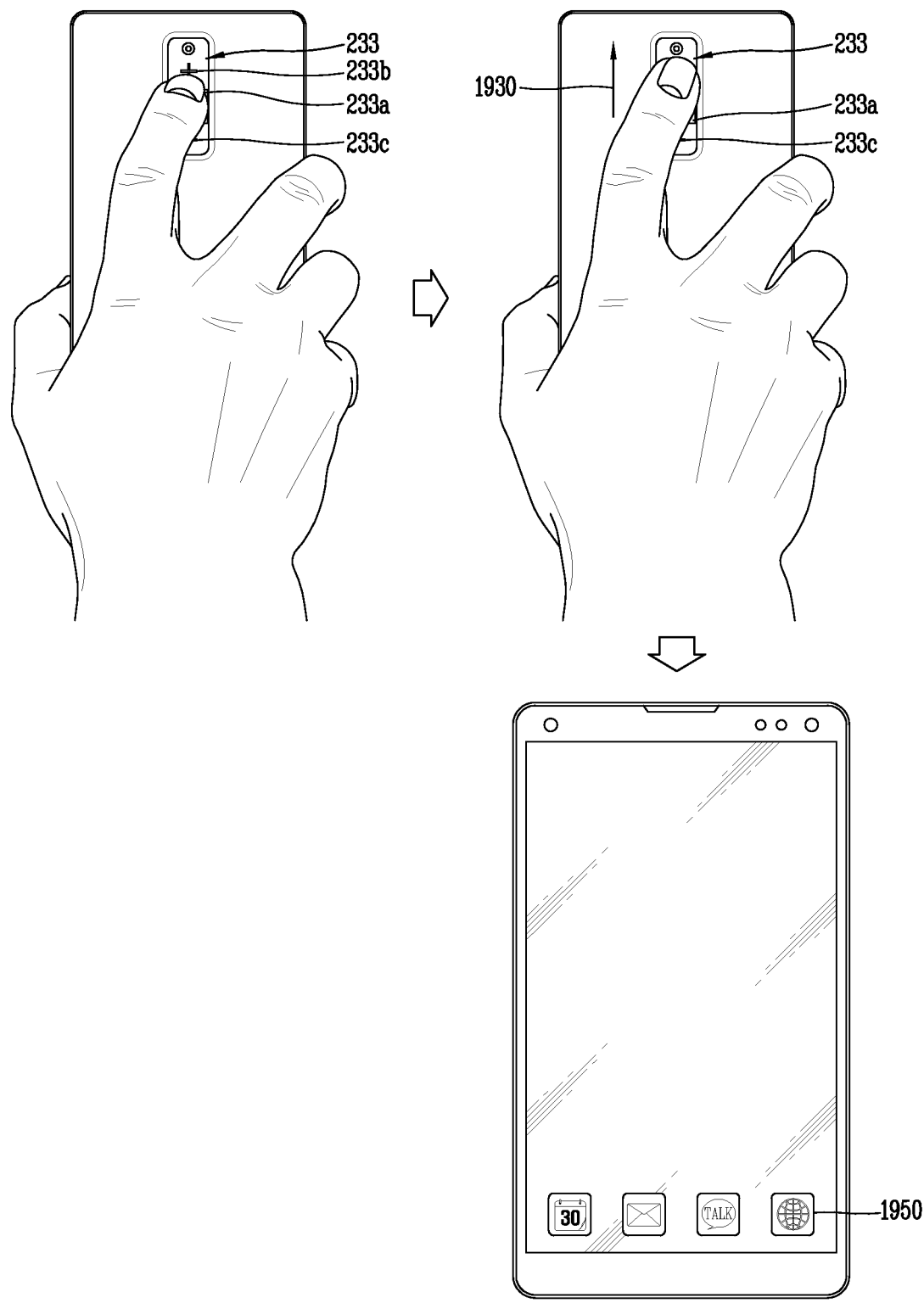

FIGS. 19A through 19C are conceptual views for explaining an embodiment in which an icon is displayed according to a touch operation for a fingerprint input and whether or not the fingerprint is authenticated.

Referring to FIG. 19A, the user may apply a touch input or push input for a fingerprint input for a predetermined period of time to one region 233a of the rear input unit 233 with his or her forefinger. Subsequently, a touch input 1910 for rubbing his or her forefinger may be applied to a volume down region 233c disposed on the rear input unit 233.

Accordingly, screen information such as date, time, a notification message and the like may be displayed in an upper region 1920 of the display unit 151 in an inactive state for a preset period of time.

For another embodiment, referring to FIG. 19B, the user may apply a touch input or push input for a fingerprint input for a predetermined period of time to one region 233a of the rear input unit 233 with his or her forefinger. Subsequently, a touch input 1930 for rubbing his or her forefinger may be applied to a volume up region 233b disposed on the rear input unit 233.

Accordingly, when the entered fingerprint is not authenticated, the icons 1940 of applications in which there is no danger of exposing personal information such as a flashlight, a calculator, a camera, and the like may be displayed in a lower region of the display unit 151 in an inactive state.

For still another embodiment, referring to FIG. 19C, similarly to FIG. 19B, the user may apply a touch input or push input for a fingerprint input for a predetermined period of time to one region 233a of the rear input unit 233 with his or her forefinger. Subsequently, a touch input 1930 for rubbing his or her forefinger may be applied to a volume up region 233b disposed on the rear input unit 233.

Accordingly, when the entered fingerprint is authenticated, the icons 1950 of applications in which there is a danger of exposing personal information such as a text, a messenger, a banking account, and the like may be displayed in a lower region of the display unit 151 in an inactive state.

On the other hand, the controller 180 may display at least one preset object in one region of the display unit 151 in the inactive state to be displayed in response to a fingerprint sensed on the fingerprint recognition sensor 233a and the mode of the touch input based on a touch input for fingerprint input sensed on the fingerprint recognition sensor 233a.

Figure 20A:
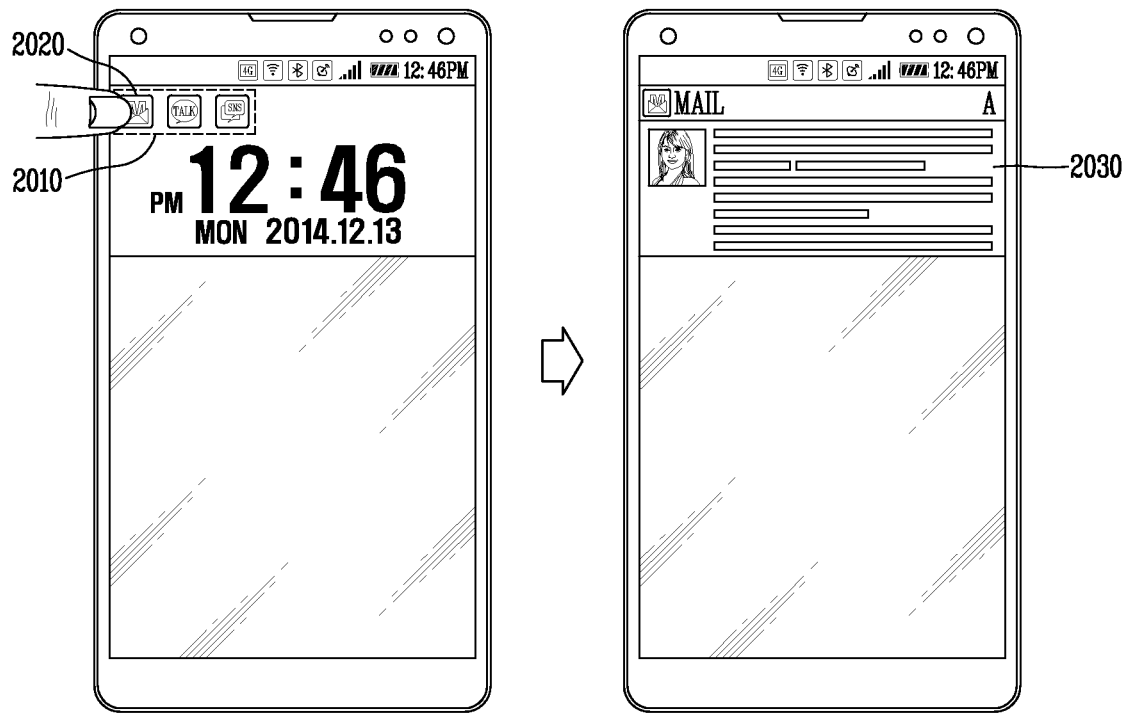
FIGS. 20A and 20B are conceptual views for explaining an embodiment in which an icon is displayed according to a user.
Figure 20B:
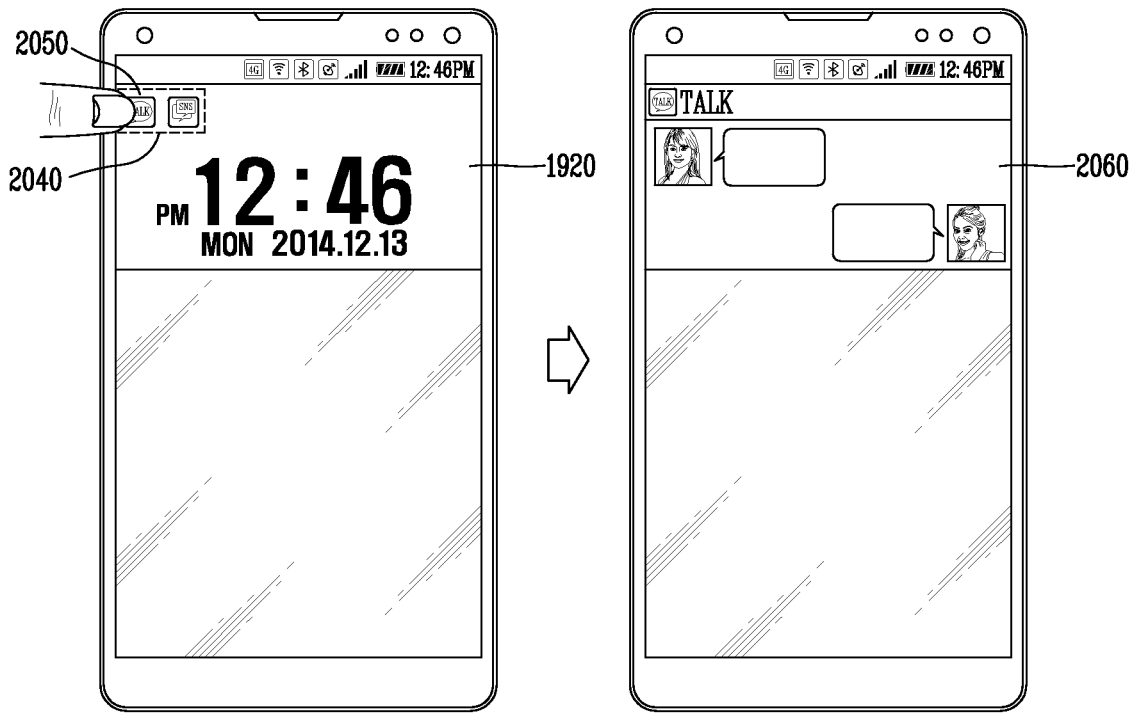

FIGS. 20A and 20B are conceptual views for explaining an embodiment in which an icon is displayed according to a user.

Referring to FIG. 20A, user A for which fingerprint registration has been made may apply a touch input or push input for a fingerprint input for a predetermined period of time to one region 233a of the rear input unit 233 with his or her forefinger as illustrated in FIG. 19A. Subsequently, a touch input 1910 for rubbing his or her forefinger may be applied to a volume down region 233c disposed on the rear input unit 233 (refer to FIG. 19A).

Accordingly, the fingerprint of the user A that has been entered may be checked to display information such as date, time and the like and icons 2010 corresponding to events received by the user A for a preset period of time in an upper region of the display unit 151 in an inactive state. Specifically, when the user A has received a mail, a messenger, and an SNS message, icons 2010 indicating them may be displayed in an upper region of the display unit 151.

Subsequently, when the user A applies a touch input to an icon 2020 of a mail application displayed, the content of a received mail 2030 may be displayed in an upper region of the display unit 151 in an inactive state. In other words, the mail application may be carried out with an account of the user A.

For yet still another embodiment, when the user A applies a touch input again to one region 233a of the rear input unit 233, the lock may be released to display a home screen, a screen for showing notification messages received or the like on the entire display unit 151.

Referring to FIG. 20B, user B for which fingerprint registration has been made may apply a touch input or push input for a fingerprint input for a predetermined period of time to one region 233a of the rear input unit 233 with his or her forefinger as illustrated in FIG. 19A. Subsequently, a touch input 1910 for rubbing his or her forefinger may be applied to a volume down region 233c disposed on the rear input unit 233 (refer to FIG. 19A).

Accordingly, the fingerprint of the user B that has been entered may be checked to display information such as date, time and the like and icons 2010 corresponding to events received by the user B for a preset period of time in an upper region of the display unit 151 in an inactive state. Specifically, when the user B has received a notification message of a messenger, an application, icons 2040 indicating them may be displayed in an upper region of the display unit 151.

Subsequently, when the user B applies a touch input to an icon 2050 of a messenger application displayed, an execution screen 2060 of the messenger application may be displayed in an upper region of the display unit 151 in an inactive state. In other words, the messenger application may be carried out with an account of the user B.

In other words, when a fingerprint is authenticated, different screen information may be displayed according to a user corresponding to the authenticated fingerprint.

On the other hand, the controller 180 may display at least one preset object to be displayed in response to external environmental information sensed in one region of the display unit 151 in the inactive state based on a preset touch input sensed on the display unit 151 in the inactive state in one region of the display unit 151 in the inactive state.

Figure 21:
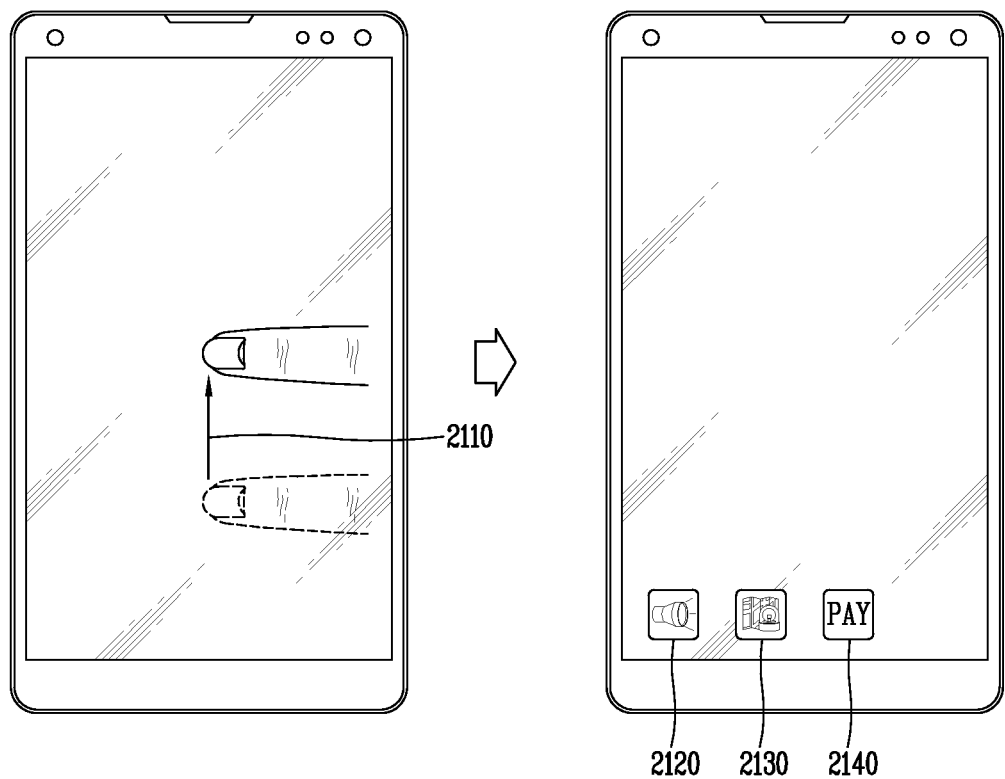
FIG. 21 is a conceptual view for explaining an embodiment in which an icon is displayed according to an external environmental state.

FIG. 21 is a conceptual view for explaining an embodiment in which an icon is displayed according to an external environmental state.

Referring to FIG. 21, a swipe input 2110 in an upward direction may be applied to the display unit 151 in an inactive state. Accordingly, the icons 2120, 2130, 2140 of applications considering sensing information sensed from various sensors may be displayed in a lower region of the display unit 151 in the inactive state.

For an embodiment, it is sensed by the illumination sensor that an external environment of the terminal is dark, and when a swipe input 2110 in an upward direction is applied to the display unit 151 in an inactive state, an icon 2120 of a flashlight application may be displayed in a lower region of the display unit 151.

For another embodiment, the movement of the terminal is sensed by the gyro sensor or the like, and when a swipe input 2110 in an upward direction is applied to the display unit 151 in an inactive state, an icon 2130 of a map application may be displayed in a lower region of the display unit 151.

For still another embodiment, it is sensed by the GPS or the like that the terminal is in proximity to a payment device, and when a swipe input 2110 in an upward direction is applied to the display unit 151 in an inactive state, an icon 2140 of a pay application may be displayed in a lower region of the display unit 151.

On the other hand, the controller 180 may display at least one preset object to be displayed in response to an external terminal connected to the terminal in one region of the display unit 151 in the inactive state based on a preset touch input sensed on the display unit 151 in the inactive state.

The external terminal may be a mobile terminal such as a cellular phone, a smart phone, a laptop computer, a digital broadcasting terminal, a personal digital assistants (PDA), a portable multimedia players (PMP), a navigator, a slate PC, a tablet PC, an ultra book, a wearable device (for example, a smart watch, smart glasses, a head mounted display (HMD)), and the like, or a stationary terminal such as a digital TV, a desktop computer, a digital signage, and the like.

Figure 22:
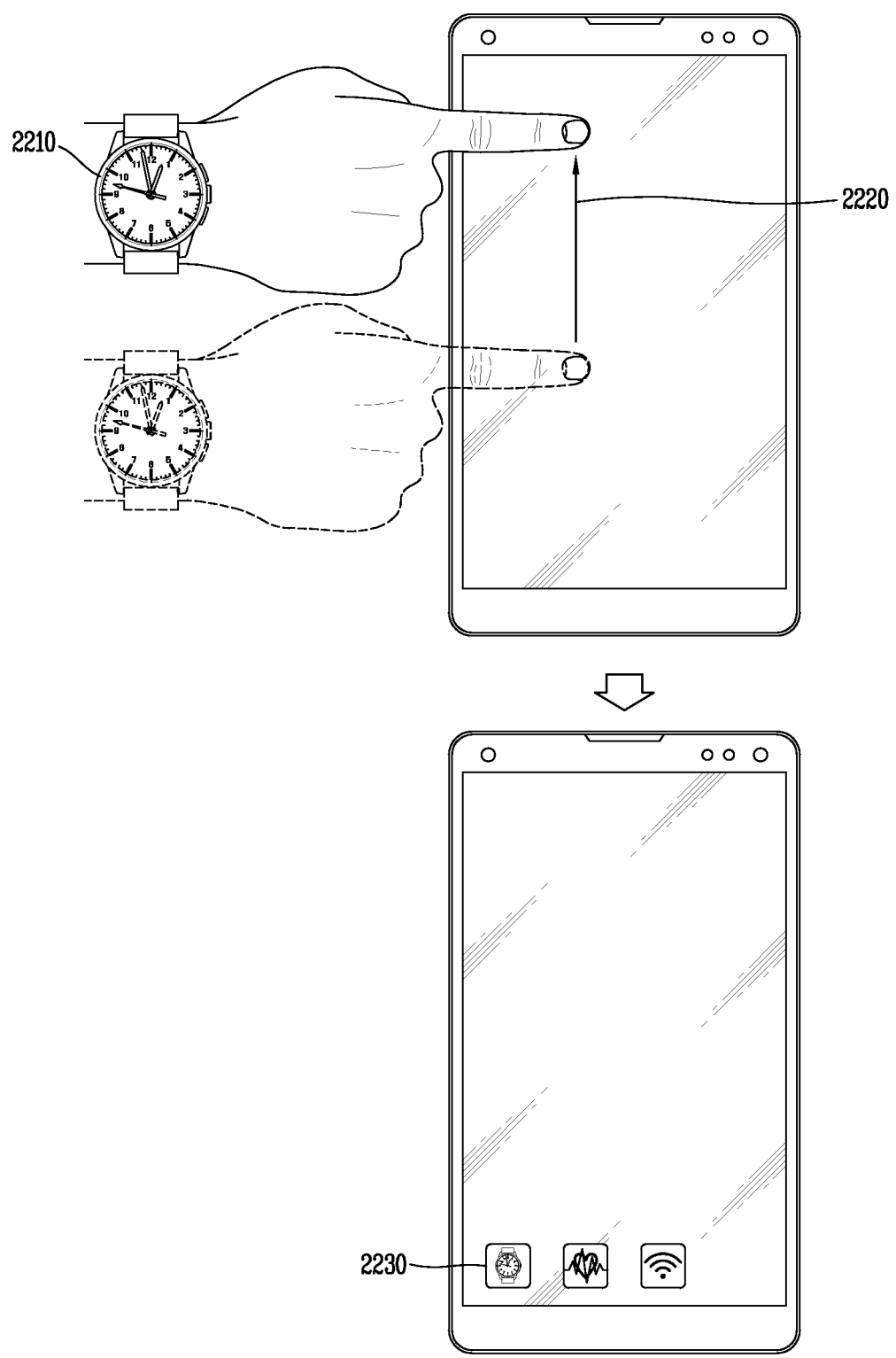
FIG. 22 is a conceptual view for explaining an embodiment in which an icon is displayed an external terminal connected thereto.

FIG. 22 is a conceptual view for explaining an embodiment in which an icon is displayed an external terminal connected thereto.

Referring to FIG. 22, the user may apply a swipe input 2220 in an upward direction to the display unit 151 in an inactive state while wearing a smartwatch 2210.

Accordingly, the icons 2230 of applications associated with the smartwatch 2210 may be displayed in a lower region of the display unit 151 in an inactive state.

For example, the icons 2230 of applications associated with the smartwatch 2210 may include icons for functional settings such as a vibration setting, a sound setting, a background screen setting, a notification setting, an Internet setting, and the like on the smartwatch 2210.

For another embodiment, the icons 2230 of applications associated with the smartwatch 2210 may include an icon of an application exhibiting heart rate information, an icon of an application shown a connection state to the smartwatch 2210, and the like.

On the other hand, the controller 180 may display at least one object for executing a preset function in a specified region based on a preset touch input for specifying the one region sensed on the display unit 151 in the inactive state.

Figure 23:
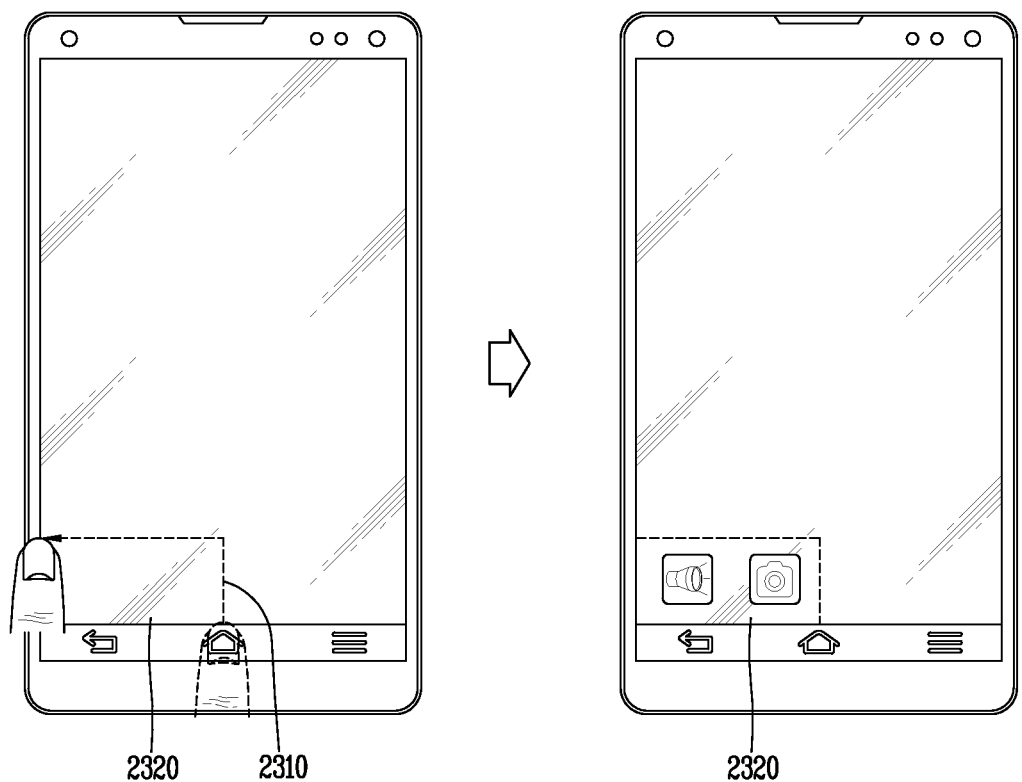
FIG. 23 is a conceptual view for explaining an embodiment in which an icon is displayed in one specified region.

FIG. 23 is a conceptual view for explaining an embodiment in which an icon is displayed in one specified region.

Referring to FIG. 23, a touch input 2310 for specifying one region may be applied to the display unit 151 in an inactive state.

Specifically, a touch input 2310 for moving a finger from an outside of the display unit 151 to an inside thereof and then moving it again from the inside to the outside may be applied, and a specific region 2320 may be specified as a result of the touch input.

Accordingly, icons corresponding to preset applications may be displayed in the specific region 2320.

The effects of a mobile terminal according to the present disclosure and a control method thereof will be described as follows.

According to at least one of the embodiments of the present disclosure, the activation of a fingerprint recognition sensor may be set according to a specific circumstance, thereby having an advantage of reducing the current consumption According to at least one of the embodiments of the present disclosure, preset screen information may be displayed with fingerprint recognition, thereby having an advantage of reducing a procedure for lock release and an entry procedure for displaying the preset screen information.

According to at least one of the embodiments of the present disclosure, preset screen information may be displayed in one region of a screen in an inactive state with a simple touch input, thereby having an advantage of reducing an entry procedure for displaying the preset screen information.

According to at least one of the embodiments of the present disclosure, preset screen information may be displayed in one region of a screen in an inactive state with fingerprint recognition, thereby having an advantage of reducing a procedure for lock release.

Further scope of applicability of the present invention will become apparent from the detailed description given hereinafter. However, it should be understood that the detailed description and specific examples such as preferred embodiments of the invention are given by way of illustration only, since various changes and modifications within the spirit and scope of the invention will become apparent to those skilled in the art from this detailed description.

The foregoing present invention may be implemented as codes readable by a computer on a medium written by the program. The computer-readable media may include all kinds of recording devices in which data readable by a computer system is stored. Examples of the computer-readable media may include hard disk drive (HDD), solid state disk (SSD), ROM, RAM, CD-ROM, magnetic tape, floppy disk, and optical data storage device, and the like, and also include a device implemented in the form of a carrier wave (for example, transmission via the Internet). In addition, the computer may include the controller 180 of the terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A mobile terminal, comprising:
 a display;
 a sensing unit; and
 a controller configured to:
  cause the display to display a first message list that does not include a security message received from a preset security sender according to execution of a message application, the first message list including a general message received from a sender other than the security sender;
  cause the display to display an icon indicating receipt of at least one security message on the first message list in response to the received at least one security message, wherein the icon includes a number of the at least one security message received and not included in the first message list;
  recognize a user's fingerprint from a touch input received via the sensing unit in response to the displayed icon;
  cause the display to display a second message list that includes the at least one security message and the general message instead of the first message list, when the recognized fingerprint is authenticated and while the touch input is applied to the sensing unit; and
  cause the display to stop displaying the second message list and display the first message list that does not include the at least one security message when the touch input is no longer applied to the sensing unit.

2. The mobile terminal of claim 1, wherein:
 the display is located at a front side of a body of the mobile terminal; and
 the sensing unit is located at a back side of the body.

3. The mobile terminal of claim 1, wherein the icon is also displayed on the second message list when the second message list is displayed instead of the first message list.

4. The mobile terminal of claim 1, wherein a number of messages shown in the first message list is less than a number of messages shown in the second message list.

5. The mobile terminal of claim 1, wherein each of the first message list and the second message list includes a message preview of each message included in the first message list and the second message list, respectively.

6. The mobile terminal of claim 1, wherein the first message list and the second message list are different.

7. A control method of a mobile terminal comprising a display and a sensing unit, the method comprising:
- displaying a first message list that does not include a security message received from a preset security sender according to execution of a message application, the first message list including a general message received from a sender other than the preset security sender;
- displaying an icon indicating receipt of at least one security message on the first message list in response to the received at least one security message, wherein the icon includes a number of the at least one security message received and not included in the first message list;
- recognizing a user's fingerprint from a touch input received via the sensing unit, when the touch input is applied to the sensing unit in response to the displayed icon;
- displaying a second message list that includes the at least one security message and the general message instead of the first message list, when the recognized fingerprint is authenticated and while the touch input is applied to the sensing unit; and
- stopping the displaying of the second message list and displaying the first message list that does not include the at least one security message, when the touch input is no longer applied to the sensing unit.

8. The method of claim 7, wherein:
- the display is located at a front side of a body of the mobile terminal; and
- the sensing unit is located at a back side of the body.

9. A mobile terminal, comprising:
- a display;
- a sensing unit; and
- a controller configured to:
  - cause the display to display a first message list that does not include a security message received from a preset security sender according to execution of a message application, the first message list including a general message received from a sender other than the security sender;
  - cause the display to display an icon indicating receipt of at least one security message on the first message list in response to the received at least one security message;
  - recognize a user's fingerprint from a touch input received via the sensing unit in response to the displayed icon;
  - cause the display to display a second message list that includes the at least one security message and the general message instead of the first message list when the recognized fingerprint is authenticated and while the touch input is applied to the sensing unit; and
  - cause the display to stop displaying the second message list and display the first message list that does not include the at least one security message when the touch input is no longer applied to the sensing unit,
- wherein each of the first message list and the second message list includes a message preview of each message included in the first message list and the second message list, respectively.

* * * * *